(12) United States Patent
Takahashi et al.

(10) Patent No.: US 6,237,330 B1
(45) Date of Patent: May 29, 2001

(54) EXHAUST PURIFICATION DEVICE FOR INTERNAL COMBUSTION ENGINE

(75) Inventors: Hideaki Takahashi; Kimiyoshi Nishizawa; Takeshi Nakamura, all of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/289,980

(22) Filed: Apr. 13, 1999

(30) Foreign Application Priority Data

Apr. 15, 1998 (JP) .................................. 10-104762
Nov. 24, 1998 (JP) .................................. 10-332470
Mar. 24, 1999 (JP) .................................. 11-079492

(51) Int. Cl.$^7$ ...................................................... F01N 3/08
(52) U.S. Cl. ......................................................... 60/285
(58) Field of Search ........................... 60/285, 302, 299; 123/443

(56) References Cited

U.S. PATENT DOCUMENTS

| | | | |
|---|---|---|---|
| 4,467,602 | * | 8/1984 | Iizuka et al. ........................... 60/276 |
| 4,484,548 | * | 11/1984 | Sugasawa et al. ................. 123/198 F |
| 5,388,402 | * | 2/1995 | Aoki et al. ............................. 60/285 |
| 5,758,493 | * | 6/1998 | Asik et al. ............................. 60/274 |
| 5,974,791 | * | 11/1999 | Hirota et al. ........................... 60/276 |
| 6,014,859 | * | 1/2000 | Yoshizaki et al. ...................... 60/285 |

FOREIGN PATENT DOCUMENTS

| | | | |
|---|---|---|---|
| 4-60106 | * | 2/1992 | (JP) . |
| 4-330320 | * | 11/1992 | (JP) . |
| 5-59935 | * | 3/1993 | (JP) . |
| 5-312074 | * | 11/1993 | (JP) . |
| 6-101541 | * | 4/1994 | (JP) . |
| 6-264724 | * | 9/1994 | (JP) . |
| 6-336916 | | 12/1994 | (JP) . |
| 7-279713 | * | 10/1995 | (JP) . |
| 8-144816 | * | 6/1996 | (JP) . |
| 10-52474 | | 2/1998 | (JP) . |

* cited by examiner

*Primary Examiner*—John A. Jeffery
(74) *Attorney, Agent, or Firm*—Foley & Lardner

(57) ABSTRACT

The temperature of a downstream catalyst is effectively increased while avoiding temperature increase of an upstream catalyst, so as to remove SOx from the downstream catalyst. For this purpose, a first front three-way catalyst 21 of a first exhaust gas passage 5a connected to a first cylinder group, a second front three-way catalyst 22 of a second exhaust gas passage 5b connected to a second cylinder group, and a rear three-way catalyst 23 installed in an exhaust gas passage 5c which combines the exhaust of both of these exhaust gas passages, are provided. When the conditions hold for performing temperature increase of the rear three-way catalyst 23, the control unit 11 sets the air-fuel ratio of the exhaust supplied to one front catalyst to richer than the stoichiometric air-fuel ratio, and sets the air-fuel ratio of the exhaust gas supplied to the other front catalyst to leaner than the stoichiometric air-fuel ratio. Due to this, unburnt fuel and oxygen which passed through the front catalysts flow into the rear catalyst, promote the reactions in the rear catalyst so as to raise its temperature, and thereby promote discharge and reduction of SOx.

16 Claims, 29 Drawing Sheets

Mode setting routine (1)

EGR setting routine (1)

PHOSR setting routine(1)

FIG.23

Air-fuel ratio control value setting routine (1)

START

S341: PL1=PLS, PR1=PRS, PL2=PLS, PR2=PRS

S342: Fsox=1 ? — YES → S354: PHOSPL=PHOSPLS, PHOSPR=PHOSPRS, PHOSIL=PHOSILS, PHOSIR=PHOSIRS, DHOS=DHOSS, DL1=DS, DR1=DS, DL2=DS, DR2=DS

NO ↓

S343: Fheat=1 ? — YES → S353: PHOS=PHOSS, DHOS=DHOSS, DL1=DS, DR1=DS, DL2=DS, DR2=DS

NO ↓

S344: Frich=1 ? — YES → S352: PHOS=PHOSR, DHOS=DHOSS, DL1=DS, DR1=DS, DL2=DS, DR2=DS

NO ↓

S351: Frich=1 ? — NO → (to S353)
YES → (to S352)

S345: Frich=1 ? — YES → S350: PHOS=PHOSS, DHOS=DHOSS, DL1=DLR, DR1=DRR, DL2=DLL, DR2=DRL

NO ↓

S348: Fmode=1 ? — YES → S349: PHOS=PHOSS, DHOS=DHOSS, DL1=DLL, DR1=DRL, DL2=DLR, DR2=DRR

NO → S350

S346: Fmode=1 ? — YES → S347: PHOS=PHOSS, DHOS=DHOSR, DL1=DLR, DR1=DRR, DL2=DLL, DR2=DRL

NO

RETURN

EXHAUST PURIFICATION DEVICE FOR INTERNAL COMBUSTION ENGINE

FIELD OF THE INVENTION

The present invention relates to an exhaust purification device for an internal combustion engine.

BACKGROUND OF THE INVENTION

Some catalysts for purifying the exhaust gas of an internal combustion engine absorb NOx in exhaust gas when the air-fuel ratio is leaner than the stoichiometric air-fuel ratio. When the oxygen concentration of the exhaust gas falls, i.e. when the air-fuel ratio changes over to stoichiometric or rich, the NOx absorbed on the catalyst is desorbed, and the desorbed NOx is reduced by HC and CO which are present in the exhaust gas (JPA 6-336916 published in 1994).

However, engine fuel or lubricating oil generally contains sulfur, and SOx (sulfur oxides) in the exhaust gas tends to be absorbed by or deposit on the catalyst more easily when the vehicle is being driven for long periods of time at a lean air-fuel ratio. If a large amount of SOx is deposited on the catalyst, absorption of NOx declines and exhaust gas purification performance is considerably impaired.

The SOx deposited on the catalyst is discharged from the catalyst when the catalyst temperature rises above its usual level. Hence, when the amount of SOx deposited on the catalyst increases, the catalyst temperature is increased to remove SOx.

In JPA 10-54274 (published in 1998), when the amount of SOx deposited on the catalyst increases and absorption of NOx by the catalyst declines, lean misfire of the engine is performed for a predetermined time. Due to this, the amount of unburnt components increases in the exhaust gas, the temperature of the catalyst increases when these unburnt components are burnt in the catalyst, and SOx is discharged.

Alternatively, the ignition timing of the engine is retarded to increase the temperature of the exhaust gas and discharge SOx from the catalyst.

However, although the temperature increase effect is large when a lean misfire is performed and unburnt components are burnt in the catalyst, it is difficult to correctly control the amount of unburnt components sent to the catalyst, and there is a possibility of the temperature rising too much and impairing the durability of the catalyst.

On the other hand, since the temperature increase due to the retardation angle of the ignition timing raises the catalyst temperature indirectly by raising the exhaust gas temperature, a sufficient temperature increase for discharging SOx is not necessarily achieved even if durability is maintained.

A method is known of improving exhaust gas composition immediately after engine startup by installing a three-way catalyst on the upstream side, i.e. in the exhaust manifold, where the temperature after startup increases quickly. However, if an NOx absorption catalyst is also installed downstream of the upstream three-way catalyst and it is attempted to raise the temperature in order to discharge SOx from the downstream catalyst, the temperature of the upstream catalyst increases too much, and these severe temperature conditions lead to early deterioration of the upstream catalyst.

SUMMARY OF THE INVENTION

It is therefore an object of the present invention to provide an exhaust purification device for an internal combustion engine which increases the temperature of a downstream catalyst effectively while avoiding the temperature increase of an upstream catalyst.

It is a further object of the invention to provide an exhaust purification device for an internal combustion engine which can efficiently remove SOx from a downstream NOx absorption catalyst.

In order to achieve above the objects the present invention provides an exhaust purification device for an internal combustion engine which comprises a first front three-way catalyst installed in a first exhaust passage connected to a first cylinder group, a second front three-way catalyst installed in a second exhaust passage connected to a second cylinder group, a rear three-way catalyst installed in an exhaust gas passage which combines the exhaust of the first and second exhaust passages, a first air-fuel ratio controller for controlling the air-fuel ratio of the exhaust led to the first front three-way catalyst to a predetermined air-fuel ratio, a second air-fuel ratio controller for controlling the air-fuel ratio of the exhaust led to the above-mentioned second front three-way catalyst to a predetermined air-fuel ratio, and a microprocessor programmed to determine the conditions under which the temperature of the rear three-way catalyst should be increased, and to set the air-fuel ratio of the exhaust controlled by one of the air-fuel ratio controllers to a richer air-fuel ratio than the stoichiometric air-fuel ratio, and to set the air-fuel ratio of the exhaust controlled by the other of the air-fuel ratio controllers to a leaner air-fuel ratio than the stoichiometric air-fuel ratio, when the conditions hold for increasing the temperature of the rear three-way catalyst.

The details as well as other features and advantages of the invention are set forth in the remainder of the specification and are shown in the accompanying drawings.

BRIEF DESCRIPTION OF THE DRAWINGS

FIG. 23 is a flowchart for setting an air-fuel ratio control value according to a third embodiment.

DESCRIPTION OF THE PREFERRED EMBODIMENTS

Figure 1:
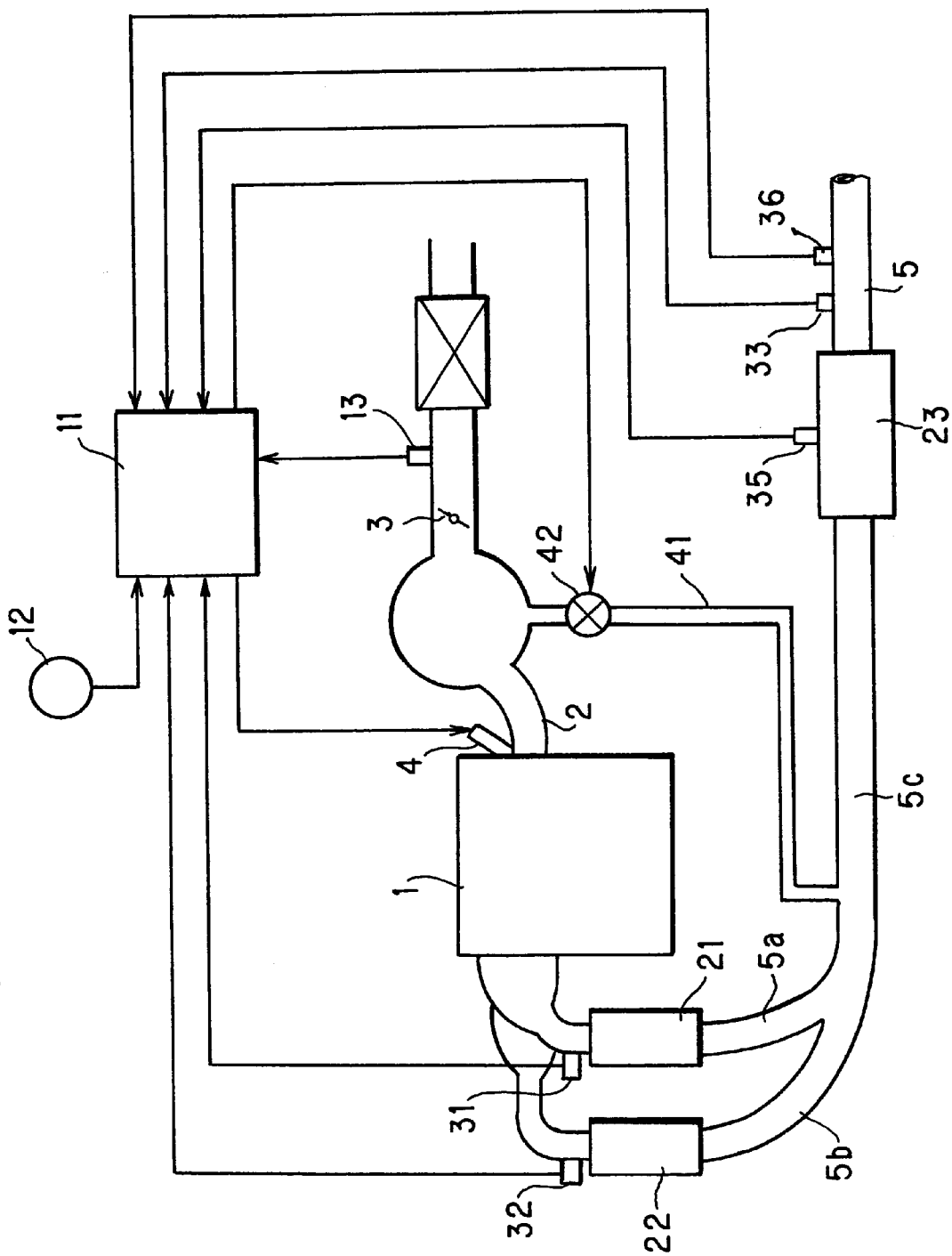
FIG. 1 is a schematic diagram showing a first embodiment of this invention.

Hereafter, the embodiments of this invention will be described referring to the drawings.

First, describing a first embodiment, in FIG. 1, 1 is a spark-ignition type gasoline engine, 2 is an intake passage, and 3 is an intake throttle valve.

Fuel injection valves 4 are formed to supply fuel directly to each cylinder of the engine 1.

In this case, lean stratified combustion may be performed by setting the fuel injection timing of the fuel injection valves 4 to coincide with the compression stroke, or stoichiometric or rich premixing combustion can be performed by setting the fuel injection timing of the fuel injection valves 4 to coincide with the intake stroke. However, the fuel injection valves 4 may inject fuel into the intake passage 2 downstream of the throttle valve 3.

Although not shown, of the intake valve and the exhaust valve, the opening timing of at least the exhaust valve may be varied by a variable valve mechanism.

An exhaust gas passage 5 comprises first and second exhaust manifolds 5a, 5b corresponding to a first cylinder group and second cylinder group of the engine 1, and an exhaust gas tube 5c which combines the exhaust gases from these first and second manifolds 5a, 5b.

A three-way catalyst 21 which functions as a first front catalyst and a three-way catalyst 22 which functions as a second front catalyst are respectively installed in the first and second exhaust manifolds 5a, 5b. An NOx absorption/reduction type three-way catalyst 23 is installed in the downstream exhaust gas tube 5c as a rear catalyst.

The upstream three-way catalysts 21, 22 are installed in the exhaust manifolds of the engine so that the temperature increases immediately after startup, and the downstream three-way catalyst 23 is installed for example under the floor of the vehicle away from the engine 1 to maintain its heat resisting properties.

The exhaust discharged from the first and second cylinder groups is led to the three-way catalysts 21 and 22 respectively. Therein, NOx is reduced and HC, CO are oxidized with maximum efficiency at the stoichiometric air-fuel ratio.

Although the NOx absorption/reduction three-way catalyst 23 performs reduction of NOx and oxidation of HC, CO with the greatest conversion efficiency at the stoichiometric air-fuel ratio, NOx in the exhaust gas is absorbed when the air-fuel ratio is lean. This NOx is desorbed when the oxygen concentration of the exhaust gas falls, e.g. at the stoichiometric air-fuel ratio or a rich air-fuel ratio, and the desorbed NOx is reduced by HC and CO in the exhaust gas.

To control the fuel injection amount and fuel injection tiring of the above-mentioned fuel injection valves 4 according to running conditions, a control unit 11 is provided.

A rotation angle signal from a crank angle sensor 12, intake air amount signal from an air flow meter 13, air-fuel ratio (oxygen concentration) signals from $O_2$ sensors 31, 32 installed respectively upstream of the above-mentioned three-way catalysts 21, 22 and an $O_2$ sensor 33 arranged downstream of the downstream three-way catalyst 23, a signal from $NO_x$ sensor 36 installed downstream of the downstream three-way catalyst 23, and a signal indicating the temperature of the downstream three-way catalyst 23 from a catalyst temperature sensor 35, are input to this control unit 11.

41 is an EGR (exhaust gas recirculation) passage which connects the intake passage 2 and exhaust gas passage 5 to recirculate a part of exhaust gas to the intake passage 2. An EGR control valve installed in the EGR passage 41 is controlled by the control unit 11 to control a flow amount of a EGR gas based on the running condition.

Also, although not shown, signals from a water temperature sensor which detects an engine cooling water temperature, a gear position sensor which detects the gear position of a transmission, an accelerater position sensor which detects an accelerater depression amount, and a vehicle speed sensor which detects vehicle speed, are also input. Based on these signals, the fuel injection amount and fuel injection timing of the fuel injection valves 4 are controlled, and the ignition timing of a spark plug, not shown, and the valve opening timing of the exhaust valve, are variably controlled.

Further, in the control unit 11, when sulfur oxides (SOx) in the exhaust gas have deposited on the NOx absorption/reduction three-way catalyst 23 and NOx absorption declines, control is performed for eliminating the deposited SOx. For this purpose, the air-fuel ratios of the cylinder groups are set so that the air-fuel ratio of the exhaust gas flowing into the three-way catalyst 21 in one of the exhaust passages is richer than the stoichiometric air-fuel ratio, the air-fuel ratio of the exhaust gas flowing into the other three-way catalyst 22 is lean, and the air-fuel ratio of the exhaust gas after the two exhaust gas streams are combined is the stoichiometric air-fuel ratio or an air-fuel ratio richer than stoichiometric.

As a result, a lean gaseous mixture flows into the three-way catalyst 21, a rich gaseous mixture flows into the three-way catalyst 22, and excess unburnt components and oxygen which do not contribute to the catalytic reaction and oxygen flow downstream and into the NOx absorption/reduction three-way catalyst 23. The reaction in the three-way catalyst 23 is promoted by the unburnt components and oxygen, and the catalyst temperature rises. This discharges SOx which has been absorbed and accumulated on the three-way catalyst 23, and reduces and purifies the SOx, so that the function of the catalyst 23 is restored. On the other hand, as the upstream three-way catalysts 21, 22 have either a lean or rich air-fuel ratio, their catalytic reactions are suppressed, preventing their temperatures from rising excessively which would damage their durability.

The details of the control performed by the control unit 11 will now be described in detail by the following flowcharts.

Figure 2:
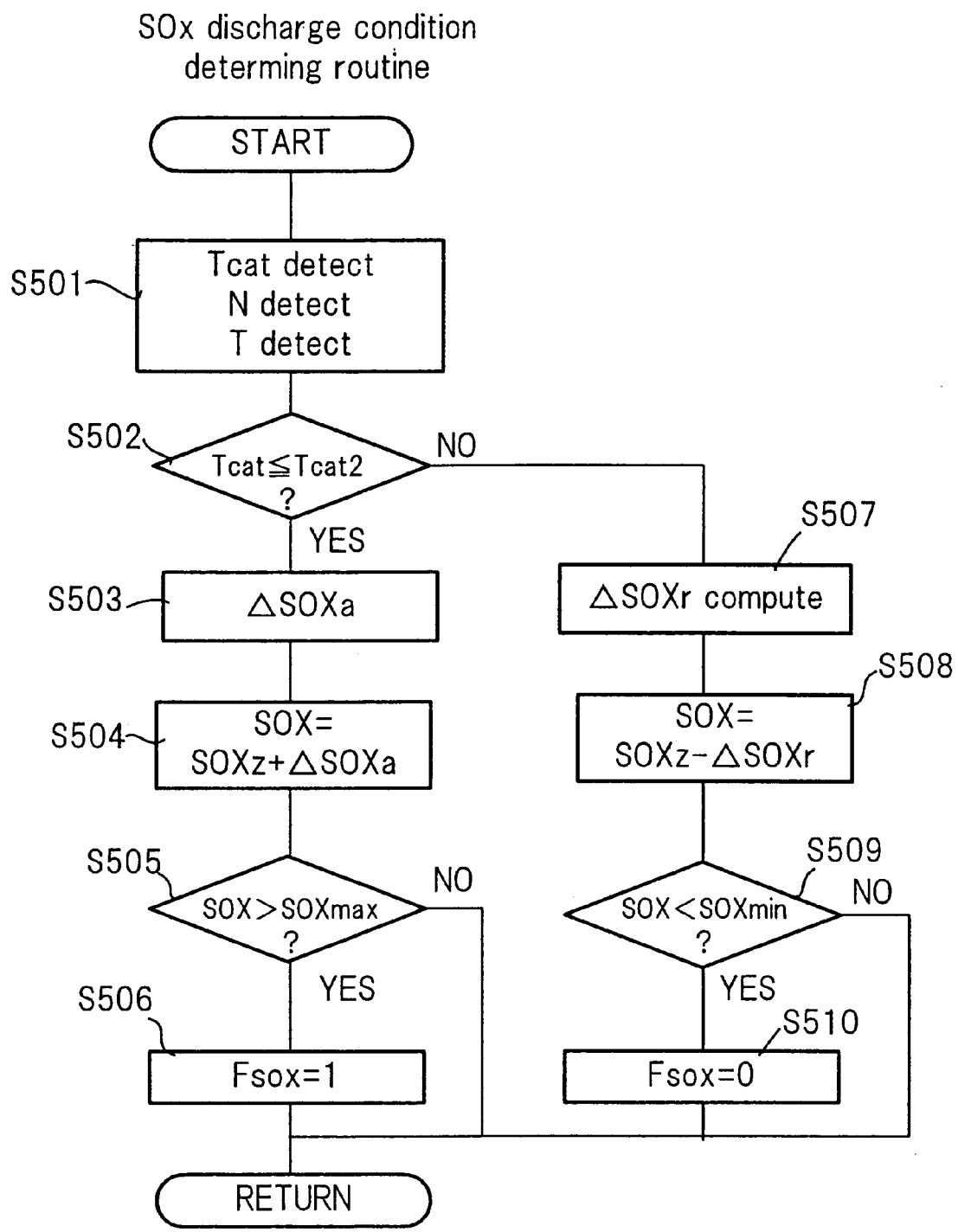
FIG. 2 is a flowchart for determining SOx discharge conditions according to the first embodiment.

FIG. 2 is a determining routine (1) for determining the discharge conditions for SOx deposited on the NOx absorption/reduction catalyst which is the rear catalyst, and it is performed at an interval of 10 ms.

Here, the amount of SOx which the rear catalyst has absorbed and accumulated is estimated, and it is determined whether the amount of SOx deposited on the catalyst has reached a predetermined value, i.e. whether or not the conditions for discharging SOx hold.

Specifically, when the conditions for discharging SOx hold a flag Fsox is set to 1, and when they do not hold, the flag Fsox is set to 0.

First, in a step S501 (steps will hereafter be referred to as S . . . ), the output of the catalyst temperature sensor is A/D converted to find a rear catalyst temperature Tcat Also, an engine rotation speed N is calculated based on the occurrence interval of a predetermined signal of the crank angle sensor, and an engine load T (for example, a target generation torque of the engine depending on an accelerator depression amount) is calculated based on the output of the accelerator position sensor.

The rear catalyst temperature Tcat may be estimated based on engine rotation speed and engine load.

In S502, it is determined whether or not the temperature Tcat of the rear catalyst is equal to or less than an SOx discharge temperature Tcat2. When it is equal to or less than Tcat2, SOx is absorbed and accumulated by the catalyst, and when it is higher than Tcat2, SOx is discharged.

In S503, $\Delta$SOXa which is the amount of SOx absorbed on the rear catalyst in a predetermined time (here 10 ms) is computed.

Specifically, $\Delta$SOXa=(amount of SOx flowing into rear catalyst in predetermined time)*(SOx absorption coefficient of rear catalyst).

Here, the amount of SOx flowing into the catalyst in predetermined unit time is computed as a parameter of, for example, the engine rotation speed N, engine load T and average air-fuel ratio, and the SOx absorption coefficient of the rear catalyst which is the amount of SOx absorbed in unit time, is computed as a parameter of, for example, catalyst temperature Tcat and average air-fuel ratio. The SOx absorption rate=(SOx absorption amount in unit time)/(Sox introducing amount in unit time). As average air-fuel ratio, a target equivalent ratio TFBYA set by the target air-fuel ratio setting routine described hereafter, can be used.

The SOx absorption rate of the rear catalyst is a value from 0 to 1, and it has the following characteristics relative to various parameters.

The SOx absorption rate becomes larger the less the absorption amount of the rear catalyst, and is a maximum when the absorption amount is 0. The SOx absorption rate is a maximum when the catalyst temperature is a predetermined temperature. When the temperature is lower than the predetermined temperature, it decreases the lower the temperature, and is 0 below the catalyst activation temperature. When the temperature is higher than the predetermined temperature, it decreases the higher the temperature, and is 0 at or above the SOx discharge temperature. The SOx absorption coefficient decreases the smaller the leanness of the air-fuel ratio, and is 0 at an air-fuel ratio richer than stoichiometric.

Next, in S504, the SOx absorption amount $\Delta$SOXa per a predetermined time is added to SOXz, the estimated amount of SOx computed on the immediately preceding occasion, to compute the most recent SOX. In S505, it is determined whether or not the estimated SOx amount SOX is larger than a maximum permitted value SOXmax. This permitted value SOXmax is set at such a level that a predetermined NOx absorption capacity, i.e., an absorption capacity NOXth, remains in the rear catalyst. When the estimated absorption amount is larger than the permitted value, the flag Fsox is set to 1 in S506.

When the conditions are such that the temperature is high so that SOx is discharged in S502, the routine proceeds to S507, and $\Delta$SOXr which is the amount of SOx discharged in a predetermined time (here 10 ms) from the rear catalyst is computed as follows.

$\Delta$SOXr=(predetermined time)×(SOx discharge rate from rear catalyst)

The SOx discharge rate of the rear catalyst is an SOx amount discharged in a predetermined unit time, and is computed as a parameter of, for example, the present SOx absorption amount (estimated value of SOx absorption amount computed on the immediately preceding occasion) SOXz, catalyst temperature Tcat and average air-fuel ratio. The target equivalent ratio TFBYA set by the target air-fuel ratio setting routine can be used as the average air-fuel ratio.

However, during SOx removal control, the average air-fuel ratio may be shifted to richer than the stoichiometric air-fuel ratio by shifting the center point of air-fuel ratio feedback control while TFBYA=1, and this shift amount is also taken into consideration.

The SOx discharge rate from the rear catalyst has the following characteristics relative to various parameters.

The SOx discharge rate is smaller the less the SOx absorption amount.

The SOx discharge rate is smaller the lower the catalyst temperature, and is 0 at or lower than the SOx discharge temperature. The SOx discharge rate is also smaller the less the richness of the air-fuel ratio, and is 0 at a lean air-fuel ratio.

In S508, the most recent SOx is computed by subtracting $\Delta$SOXr from the estimated SOx amount SOXz computed on the immediately preceding occasion. In S509, it is determined whether or not the estimated SOx amount SOX is less than a predetermined value SOXmin. The predetermined value SOXmin is set to a small value near 0.

When the comparison result is smaller than the predetermined value, the routine proceeds to S510, the flag Fsox is set to 0, and discharge of SOx is thereby completed.

In the above, if the estimated SOx amount should exceed the permitted amount, Fsox=1 is maintained until SOx is almost completely discharged, and SOx removal control is not performed frequently.

The estimated SOx amount SOX may be computed more simply. For example, S503 and S507 may be omitted and $\Delta$SOXa, $\Delta$SOXr in S504 and S508 may be set to fixed values. As absorption/discharge of SOx proceeds relatively slowly, it is sufficient if this routine is executed at an interval of 1 sec or 10 sec. In this case, $\Delta$SOXa, $\Delta$SOXr may be computed as absorption discharge amount of SOx at an interval of 1 sec or 10 sec.

Also, the SOx absorbed by the rear catalyst remains in the catalyst even after the engine stops, so the estimated SOX is stored even after the engine stops, and the stored SOX is used as an initial value for subsequent computation of SOX on the next occasion when the engine starts.

Figure 3:
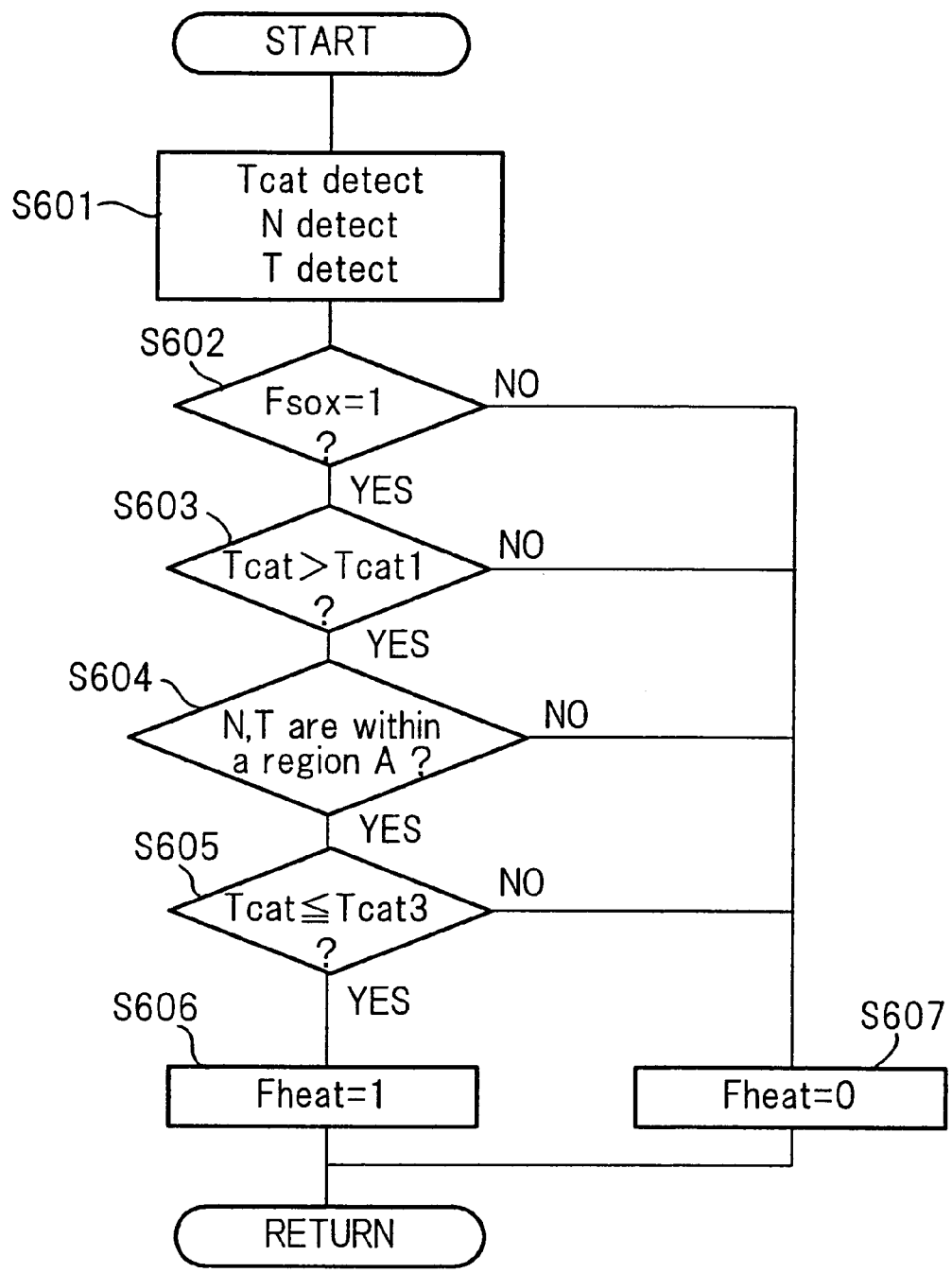
FIG. 3 is a flowchart for determining rear catalyst temperature increase conditions.

Next, FIG. 3 is a temperature rise control condition determining routine (1) of the rear catalyst, and it is performed at an interval of 10 ms.

Herein, a flag Fheat is set by determining whether or not the conditions hold for raising the temperature of the rear catalyst based on the flag Fsox and the catalyst temperature. When the conditions hold, Fheat=1 and when they do not hold Fheat=0.

First, in S601, A/D conversion is performed on the output of the rear catalyst temperature sensor to find the catalyst temperature Tcat, the engine rotation speed N is calculated based on the occurrence interval of a predetermined signal of the crank angle sensor, and an engine load T is calculated based on the output of the accelerator position sensor.

In S602, it is determined whether or not conditions hold for discharging SOx absorbed by the rear catalyst by determining whether or not the flag Fsox=1. When discharging conditions hold, it is determined whether or not the catalyst temperature Tcat is higher than the predetermined value Tcat1 in S603. The predetermined value Tcat1 is set to a lower temperature value less than the SOx discharge temperature Tcat2.

If it is attempted to increase the temperature of the rear catalyst when it is equal to or less than the predetermined value Tcat1, to a temperature equal to or higher than the SOx discharge temperature Tcat2, special control to increase the catalyst temperature has to be performed for a long period of time, but this has an adverse effect on emissions or fuel consumption. Therefore, temperature increase control is not performed when the temperature is equal to or less than Tcat1.

Figure 16:
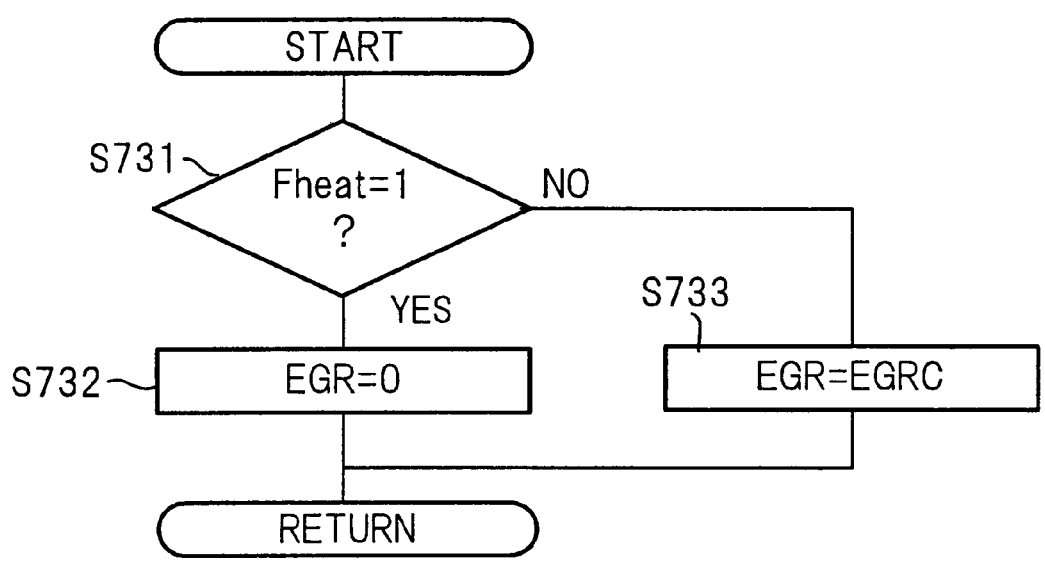
FIG. 16 is a flowchart for setting a valve apertue of an EGR valve.
Figure 17:
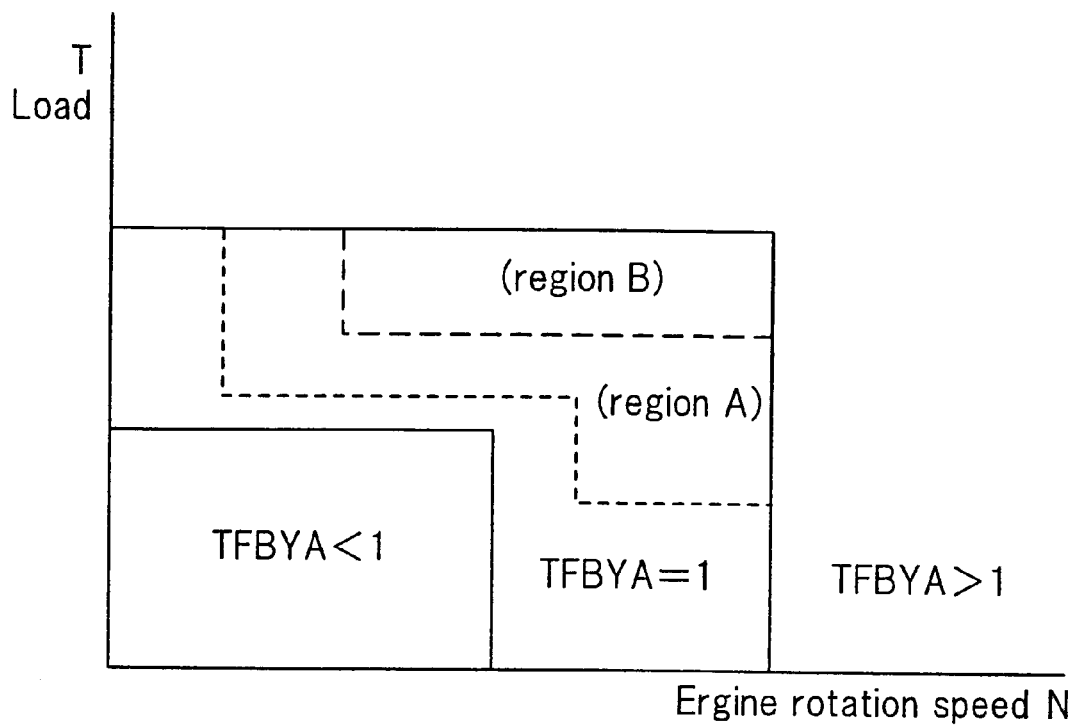
FIG. 17 is a descriptive drawing showing a running control region.

However, when the engine rotation speed N and engine load T are both large, for example when it may be considered that they are within a predetermined region (e.g. region B) in FIG. 16, and that the catalyst temperature would increase rapidly if temperature increase control were performed, temperature increase control may be permitted even when the temperature is equal to or less than Tcat1.

In S604, it is determined whether or not the engine rotation speed N and engine load Tare within a region A of FIG. 16. The region A is a running region wherein the catalyst temperature Tcat can be raised to or above the SOx discharge temperature Tcat2 when temperature increase control is performed.

Depending on the engine, there may be some cases where the catalyst temperature Tcat can be increased to or above the SOx discharge temperature TV if temperature increase control is performed even in a region usually set as a lean operating region (TFBYA<1). In such a case, only an overlapping part of the region in which temperature increase is possible with the stoichiometric air fuel ratio running region (TFBYA=1) may be set as the region A or all the regions in which temperature increase is possible may be set as the region A, and temperature increase control given priority over lean running while the conditions for discharging absorbed SOx from the rear catalyst hold (Fsox=1).

In S605, it is determined whether or not the catalyst temperature Tcat is equal to or less than a permitted temperature Tcat3. This predetermined value Tcat3 is set to a high temperature value larger than Tcat2.

The rear catalyst discharges SOx more easily the higher the temperature, but if the temperature is increased excessively the durability of the catalyst is impaired, so temperature increase control is not performed when the temperature is higher than the permitted temperature Tcat3.

Therefore, when the temperature is equal to or less than Tcat3, the flag Fheat for determining temperature increase is set to 1 in S606, but when the temperature is higher the routine proceeds to S607 and the flag Fheat is set to 0.

Figure 4:
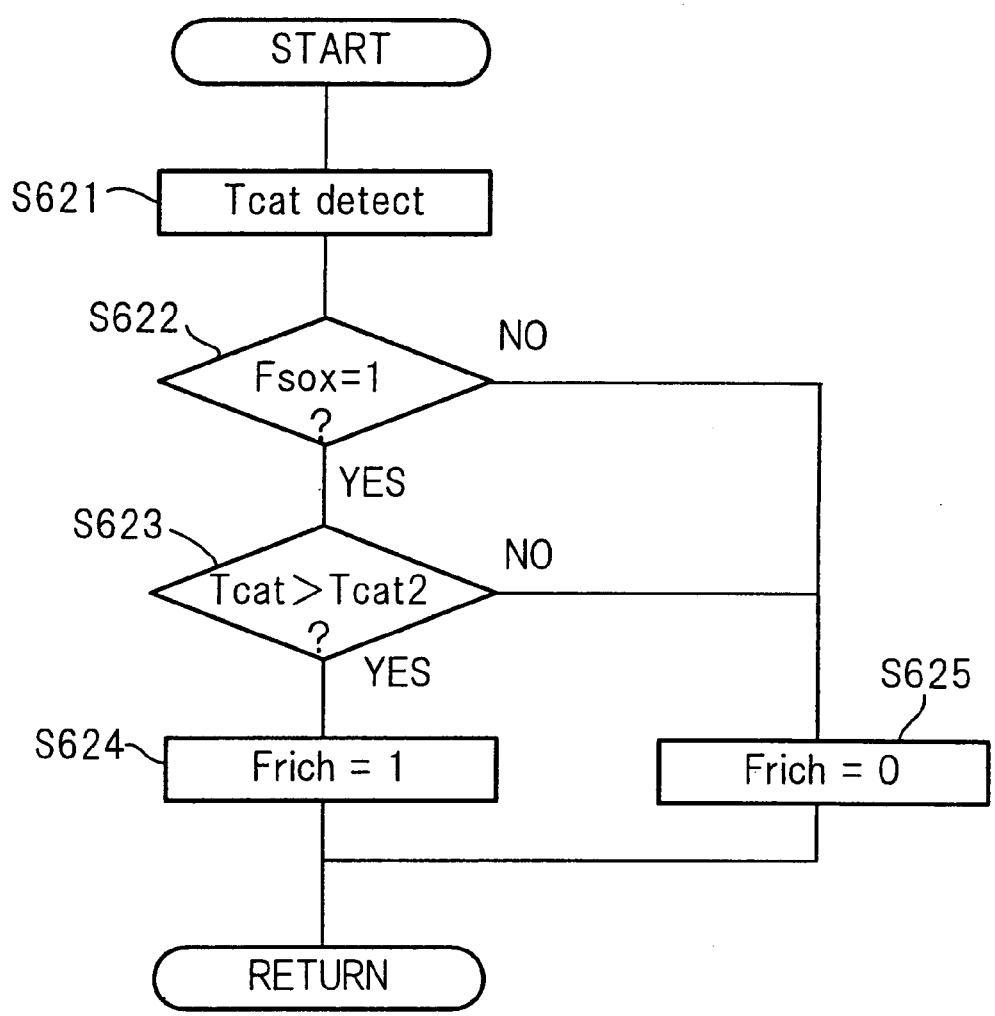
FIG. 4 is a flowchart for determining air-fuel ratio enrichment conditions.

FIG. 4 is a routine for determining the conditions for enriching the total air-fuel ratio, and it is performed at an interval of 10 ms.

Here, a flag Frich is set by determining whether the conditions for enriching the air-fuel ratio hold or do not hold, based on the determining flag Fsox of SOx discharge conditions and catalyst temperature. When air-fuel ratio enriching conditions hold, Fheat=1 and when they do not hold, Fheat=0.

In S621, the output of the catalyst temperature sensor is A/D converted to compute the catalyst temperature Tcat. In S622, it is determined whether or not the conditions hold for discharging SOx which has been absorbed and deposited by the rear catalyst.

When the discharge conditions hold, in S623, is determined whether or not the catalyst temperature Tcat is larger (higher) than the SOx discharge temperature Tcat2. When it is larger than Tcat, the air-fuel ratio is enriched to promote the discharge of SOx and reduce/purify the discharged SOx. For this purpose, when the catalyst temperature is higher than the discharge temperature, the flag Frich is set to 1 in S624.

On the other hand, when the temperature is lower than Tcat2, the routine proceeds to S625 and the flag Frich is set to 0.

Figure 5:
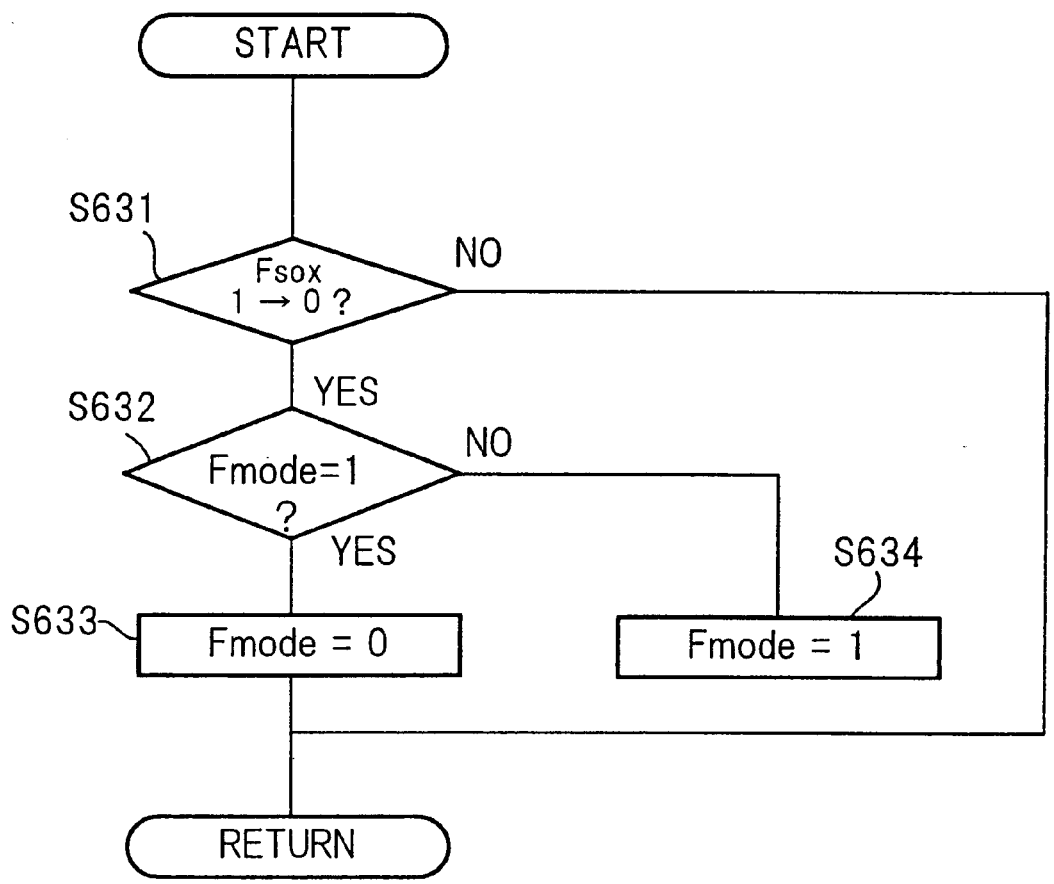
FIG. 5 is a flowchart for setting an air-fuel ratio mode.

FIG. 5 shows a mode setting routine which performs lean and rich shift of the exhaust gas air-fuel ratio in the first and second cylinder groups, and it is performed at an interval of 10 ms.

Here, the mode setting is changed over based on the variation of the determining flag Fsox of SOx discharge conditions. In this case, in the first mode, lean shift of the average air-fuel ratio of the exhaust gas led to the first front catalyst is performed, rich shift of the air-fuel ratio of the exhaust gas led to the second front catalyst is performed, and a flag Fmode is set to 1. In the second mode, the air-fuel ratios are set oppositely from the case of the first mode. In other words, in the second mode wherein the first front catalyst side is rich, and the second front catalyst side is lean, Fmode is set to 0.

In S631, it is determined from the flag Fsox whether or not the conditions for discharging SOx from the rear catalyst have changed from holding to not holding. Alternatively, it may be determined whether or not these conditions have changed from not holding to holding.

When the flag has changed, it is determined in a step S632 whether or not the flag Fmode at that time is 1, and if it is, Fmode is set to 0 in S633, otherwise Fmode is set to 1 in S634.

That is, in S632–S634, the value of the present Fmode is determined and Fmode is set to a value different from the present value.

By so doing, the mode setting is changed alternately, a situation where one front catalyst is always exposed to lean exhaust and the other front catalyst is always exposed to rich exhaust during temperature increase control of the rear catalyst is prevented, and a large difference in the rate of deterioration of the front catalysts is avoided.

Figure 6:
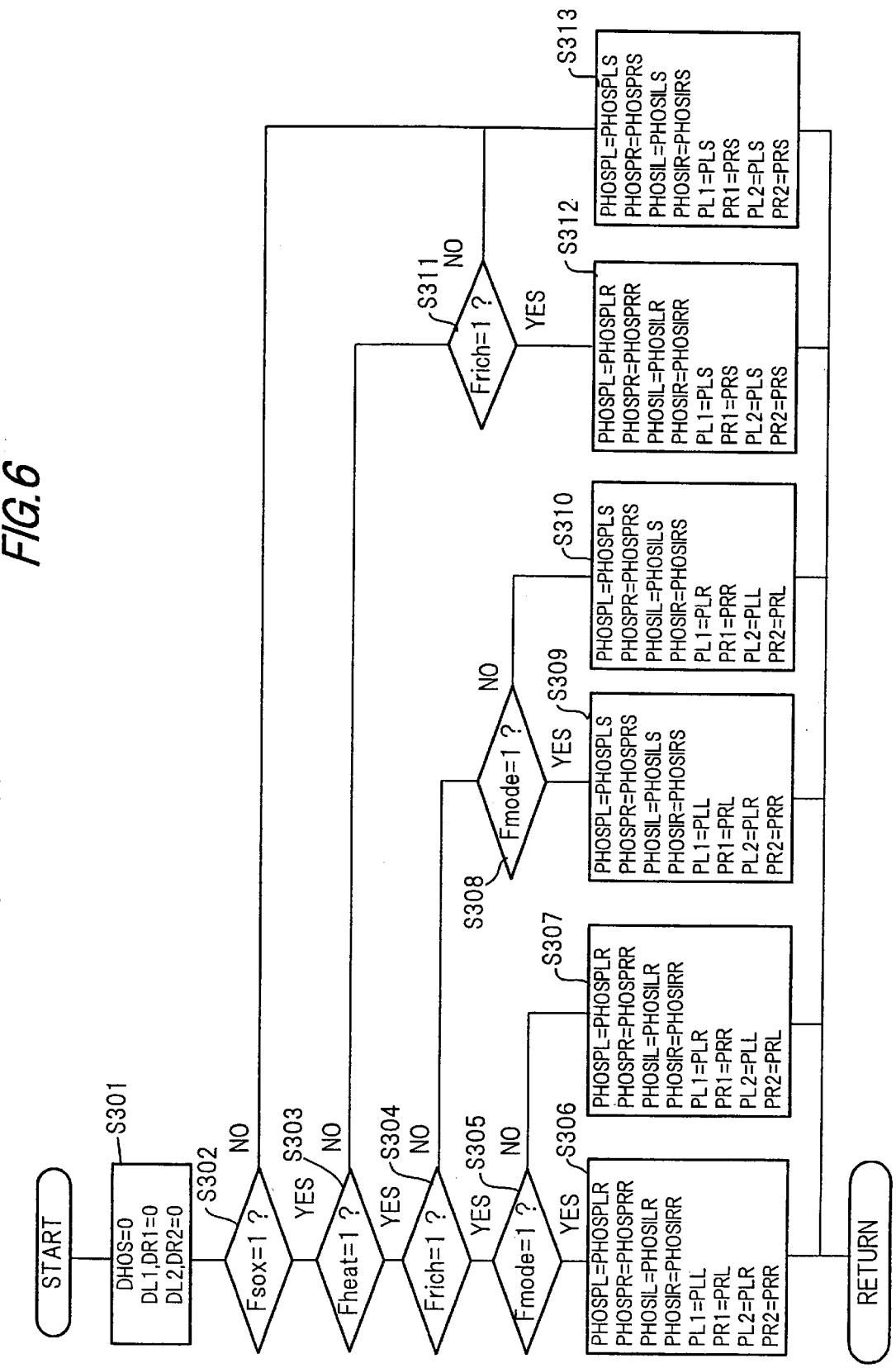
FIG. 6 is a flowchart for setting an air-fuel ratio control value.

FIG. 6 is an air-fuel ratio control value setting routine (1), and it is performed at an interval of 10 ms.

Here, the basic air-fuel ratio control parameters PL1, PR1, PL2, PR2, PHOSPL, PHOSPR, PHOSIL and PHOSIR are set based on the flags Fsox, Fheat, Frich and Fmode.

Herein, PL1, PR1 are basic control constants of proportional control for computing an air-fuel ratio feedback control correction coefficient α1 for the first cylinder group based on the $O_2$ sensor output on the first front catalyst side (PL1: rich shift proportional gain, PR1: lean shift proportional gain). When PL1>PR1, the control midpoint shifts to the rich side (the average air-fuel ratio of the exhaust gas led to the first front catalyst becomes richer), and when PL1<PR1, the control midpoint shifts to the lean side.

Further, PL2 and PR2 are basic control constants for computing an air-fuel ratio feedback control correction coefficient α2 of the second cylinder group based on the output of the $O_2$ sensor on the second front catalyst side. When PL2, PR2, the control midpoint value shifts to the rich side (the average air-fuel ratio of the exhaust gas led to the second front catalyst becomes richer), and when PL2<PR2, the control midpoint value shifts to the lean side.

PHOSPL, PHOSPR, PHOSIL, and PHOSIR are basic control constants of proportional control and integral control for computing a correction value PHOS of dual $O_2$ sensor feedback control by the two front $O_2$ sensors based on the output of the rear $O_2$ sensor. Specifically, PHOSPL=rich shift proportional gain, PHOSPR=lean shift proportional gain, PHOSIL=rich shift integral gain, and PHOSIR=lean shift integral gain.

When PHOSPL>PHOSPR or PHOSIL>PHOSIR, the control midpoint value shifts to the rich side (the average air-fuel ratio of the exhaust led to the rear catalyst becomes richer), and when PHOSPL<PHOSPR or PHOSIL<PHOSIR, the control midpoint value shifts to the lean side.

Specifically, when PHOSPL>PHOSPR or PHOSIL>PHOSIR, a correction value PHOS is computed which shifts the average air-fuel ratio of the exhaust gases led to the first and second front catalysts, to rich.

When PHOSPL<PHOSPR or PHOSIL<PHOSIR, a correction value PHOS is computed which shifts the average air-fuel ratio of the exhaust gases led to the first and second front catalysts, to lean.

DHOS, DL1, DR1, DL2 and DR2 are control values of delay time control when the correction coefficients α1, α2 are computed, but in this embodiment, all of these are set to 0 and delay time control is not performed. Moreover, the set values PL1, PR1, PL2 and PR2 are used in the a computing routine, and the set values PHOSPL, PHOSPR, PHOSIL and PHOSIR are used in the PHOS computing routine.

First DHOS, DL1, DR1, DL2 and DR2 are all set to 0 in S301. In S302 it is determined whether or not Fsox=1, in S303 it is determined whether or not Fheat=1, in S304 it is determined whether or not Frich=1, and in S305 it is determined whether or not Fmode=1. When all of these are affirmative, the routine proceeds to S306.

In S306, the values PHOSPL, PHOSPR, PHOSIL and PHOSIR are first set to the values PHOSPLR, PHOSPRR, PHOSILR and PHOSIRR, respectively. PHOSPLR, PHOSPRR, PHOSILR and PHOSIRR are values for computing the correction value PHOS which shifts the average air-fuel ratio of the exhaust gases to led to the rear catalyst, to richer than the stoichiometric air-fuel ratio.

PHOSPLR, PHOSPRR, PHOSILR and PHOSIRR are generally in the relations PHOSPLR>PHOSPRR and PHOSILR>PHOSIRR.

PHOSPLR, PHOSPRR, PHOSILR and PHOSIRR are stored in a memory (ROM) as single fixed values or as plural fixed values depending on the engine rotation speed and the load. Further, all or some of PHOSPLR, PHOSPRR and PHOSILR may be variably set according to the SOx discharge amount, and in this case are stored in an updatable memory (RAM).

Next, PL1 and PR1 are set to values PLL and PRL PLL, PRL are values which shift the average air-fuel ratio of the exhaust gas led to the first front catalyst to leaner than the stoichiometric air-fuel ratio. PLL, PRL are in the relation PLL<PRL. In addition, PLL and PRL are set so that the lean shift due to them is larger than the rich shift due to PHOSPLR, PHOSPRR, PHOSILR and PHOSIRR. PLL, PRL are stored in a memory (ROM) as single fixed values or as plural fixed values depending on the engine rotation speed and the load.

Next, PL2 and PR2 are set to values PLR and PRR. PLR, PRR are values which shift the average air-fuel ratio of the exhaust gas led to the second front catalyst to richer than the stoichiometric air-fuel ratio. PLR, PRR are in the relation PLR<PRR. PLR and PRR are stored in a memory (ROM) as single fixed values or plural fixed values depending on the engine rotation speed and the load.

When air-fuel ratio feedback control of the first and second cylinder groups is performed using only PL1, PR1, and PL2, PR2 (correction value PHOS=0), the values of PLL, PRL, PLR, PRR are set so that the average air-fuel ratio of the two exhaust gases is effectively equal to the stoichiometric air-fuel ratio.

When the mode flag Fmode is not 1 in the above-mentioned S305, the routine proceeds to S307 and the air-fuel ratio mode of the two front catalysts is reversed.

For this purpose, PHOSPL, PHOSPR, PHOSIL and PHOSIR are set to the values PHOSPLR, PHOSPRR, PHOSILR and PHOSIRR, respectively. Also, PL1 and PR1 are set to the values PLR and PRR respectively, and PL2 and PR2 are set to the values PLL and PRL respectively.

The air-fuel ratio of the first front catalyst is thereby shifted to rich, and the air-fuel ratio of the second front catalyst is shifted to lean.

When the flag Frich is not 1 in S304, the routine proceeds to S308 and it is determined whether or not Fmode=1. When the mode flag is 1, PHOSPL, PHOSPR, PHOSIL and PHOSIR are first set to the values PHOSPLS, PHOSPRS, PHOSILS and PHOSIRS, respectively.

PHOSPLS, PHOSPRS, PHOSILS and PHOSIRS are values for computing PHOS at which the average air-fuel ratio of the exhaust gas led to the rear catalyst is the stoichiometric air-fuel ratio.

In general, the values of PHOSPLS and PHOSPRS are almost equal, and the values of PHOSILS and PHOSIRS are almost equal. PHOSPLS, PHOSPRS, PHOSILS and PHOSIRS are stored in a memory (ROM) as single fixed values or plural fixed values depending on the engine rotation speed and the load.

Next, PL1 and PR1 are set to the values PLL and PRL respectively, and PL2 and PR2 are set to the values PLR and PRR to respectively.

Therefore, the air-fuel ratios of the exhaust gases led to the first and second front catalysts are lean or rich, but the air-fuel ratio of the exhaust gas led to the rear catalyst is controlled to the stoichiometric air-fuel ratio.

On the other hand, when the mode flag is not 1 in S308, the routine proceeds to S310 to reverse the mode.

In S310, after setting PHOSPL, PHOSPR, PHOSIL and PHOSIR to the values PHOSPLS, PHOSPRS, PHOSILS and PHOSIRS respectively, PL1, PR1 are set to the values PLR, PRR, and PL2, PR2 are set to the values PLL, PRL.

Here, the relation of the exhaust gas air-fuel ratio of the first and second front catalysts is reversed, the first front catalyst being rich and the second front catalyst being lean.

When the flag Fheat is not 1 in S303 (i.e., when temperature increase of the rear catalyst is not performed), the routine proceeds to S311. Here, if the flag Frich=1, PHOSPL, PHOSPR, PHOSIL and PHOSIR are first set to the values PHOSPLR, PHOSPRR, PHOSILR and PHOSIRR in S312. Subsequently, PL1, PR1 are set to the values PLS, PRS respectively. PLS and PRS are values at which, independently of other factors, the average air-fuel ratio of the exhaust gases led to the front catalysts (correction value PHOS=0) is the stoichiometric air-fuel ratio.

In general, PLS, PRS are substantially equal. PLS, PRS are stored in a memory (ROM) as plural fixed values depending on the engine rotation speed and the load. PL2, PR2 are also set to PLS, PRS, respectively.

When the rich flag Frich is not 1 in the above S311, the routine proceeds to S313.

In S313, PHOSPL, PHOSPR, PHOSIL and PHOSIR are set to the values PHOSPLS, PHOSPRS, PHOSILS and PHOSIRS, respectively. Next, PL1, PR1 are set to the values PLS, PRS respectively, and PL2, PR2 are set to the values PLS, PRS respectively.

However, PL1, PR1, PL1, PR1, PHOSPL, PHOSPR, PHOSIL and PHOSIR which are set by this routine are reflected in actual air-fuel ratio feedback control and dual $O_2$ sensor feedback control only while proportional control is being performed when the air-fuel ratio feedback correction coefficients $\alpha 1$ and $\alpha 2$ are computed, so this routine is performed with the same timing as that of proportional control.

Figure 7:
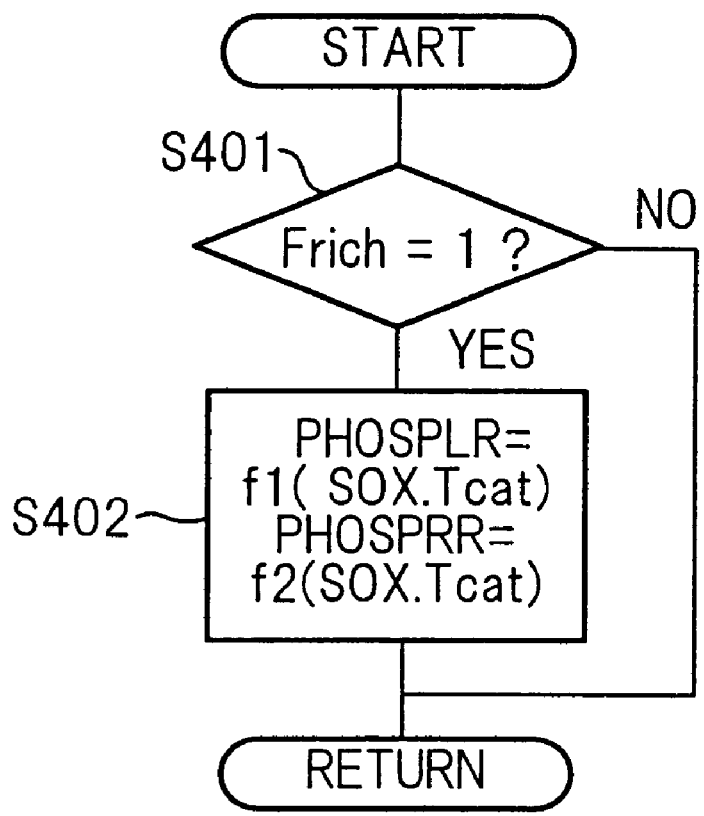
FIG. 7 is a flowchart for setting basic control constants of air-fuel ratio control.

Next, the routine shown in FIG. 7 is a routine (1) for setting the rich shift proportional gain and lean shift proportional gain PHOSPLR and PHOSPRR, and it is performed at an interval of 10 ms.

This is used when PHOSPLR, PHOSPRR in the air-fuel ratio control value setting routine are variably set depending on the SOx discharge amount.

In S401, it is determined from the rich flag Frich whether or not the conditions hold for enriching the air-fuel ratio. When enriching conditions hold, the values of PHOSPLR and PHOSPRR are computed by functions $f1$ and $f2$ in S402.

In this case, the functions $f1$ and $f2$ are determined so that the rich shift amount has the following characteristics relative to various parameters.
(1) The extent of rich shift becomes smaller the lower the SOx absorption amount, and is 0 when the absorption amount is 0.
(2) The extent of rich shift becomes smaller the lower the catalyst temperature, and is 0 below the SOx discharge temperature.

When PHOSPLR>PHOSPRR, the extent of rich shift is larger the larger the difference between PHOSPLR and PHOSPRR.

Figure 8:
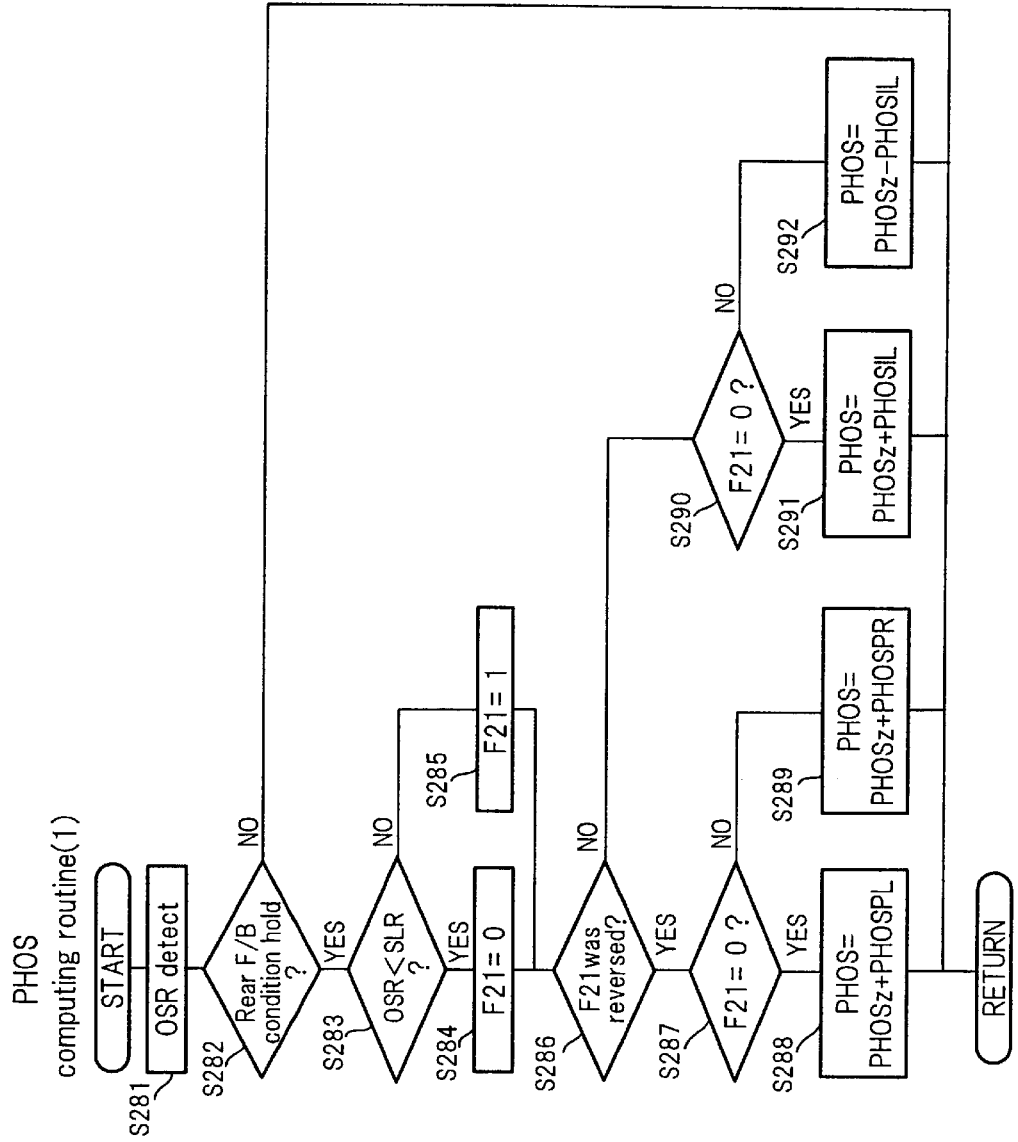
FIG. 8 is a flowchart for computing a correction value of air-fuel ratio control.

FIG. 8 is a routine (1) for computing the correction value PHOS. It is performed every time proportional control of air-fuel ratio feedback control is performed, and computes the correction value PHOS of dual $O_2$ sensor feedback control.

This PHOS is reflected in proportional control of air-fuel ratio feedback control and varies the balance of rich shift proportional control and lean shift proportional control.

When the value of PHOS is positive, the control midpoint value of air-fuel ratio feedback control is shifted to the rich side, and when the value of PHOS is negative, the control midpoint value is shifted to the lean side. This computed PHOS is used in the routine for computing the correction coefficient a.

First, in S281, A/D conversion of the output of the rear $O_2$ sensor is performed, and an oxygen concentration signal OSR is calculated. In S282, it is determined whether or not the rear air-fuel ratio feedback (rear F/B) conditions hold.

When the following conditions (1) and (2) are satisfied, it is considered that the rear F/B conditions hold.
(1) Activation of the rear $O_2$ sensor is complete.
(2) Air-fuel ratio feedback control conditions (F/B conditions) of the front $O_2$ sensors hold.

When F/B conditions hold, an oxygen concentration signal OSR is compared with a slice level SLR in S283.

Based on the comparison result, the correction value PHOS of dual $O_2$ sensor feedback control is computed by proportional control using basic control constants (rich shift proportional gain PHOSPL and lean shift proportional gain PHOSPR), and integral control using basic control constants (rich shift integral gain PHOSIL and lean shift integral gain PHOSIL). Specifically, if OSR<SLR, a flag F21 is set to 0 in S284, otherwise the flag F21 is set to 1 in S285.

In S286, it is determined whether or not F-21 was reversed, and when it was reversed, it is determined whether or not the flag F21=0 in S287. When F21=0, the correction value PHOS of dual $O_2$ sensor feedback control is computed as PHOS=PHOSz+PHOSPL in S288. The subscript z attached to the correction value PHOS shows the value on the immediately preceding occasion.

On the other hand, when the flag F21 is not 0 in S287, PHOS is computed as PHOS=PHOSz−PHOSPL in S289.

When the flag F21 was not reversed in S286, the routine proceeds to S290 and it is determined whether or not F21=0. When the flag is 0, PHOS is computed as PHOS=PFOSz+PHOSIL in S291, conversely, when F21 is not 0 in S290, the routine proceeds to S292 and PHOS is computed as PHOS=PHOSz−PHOSIR.

Figure 9:
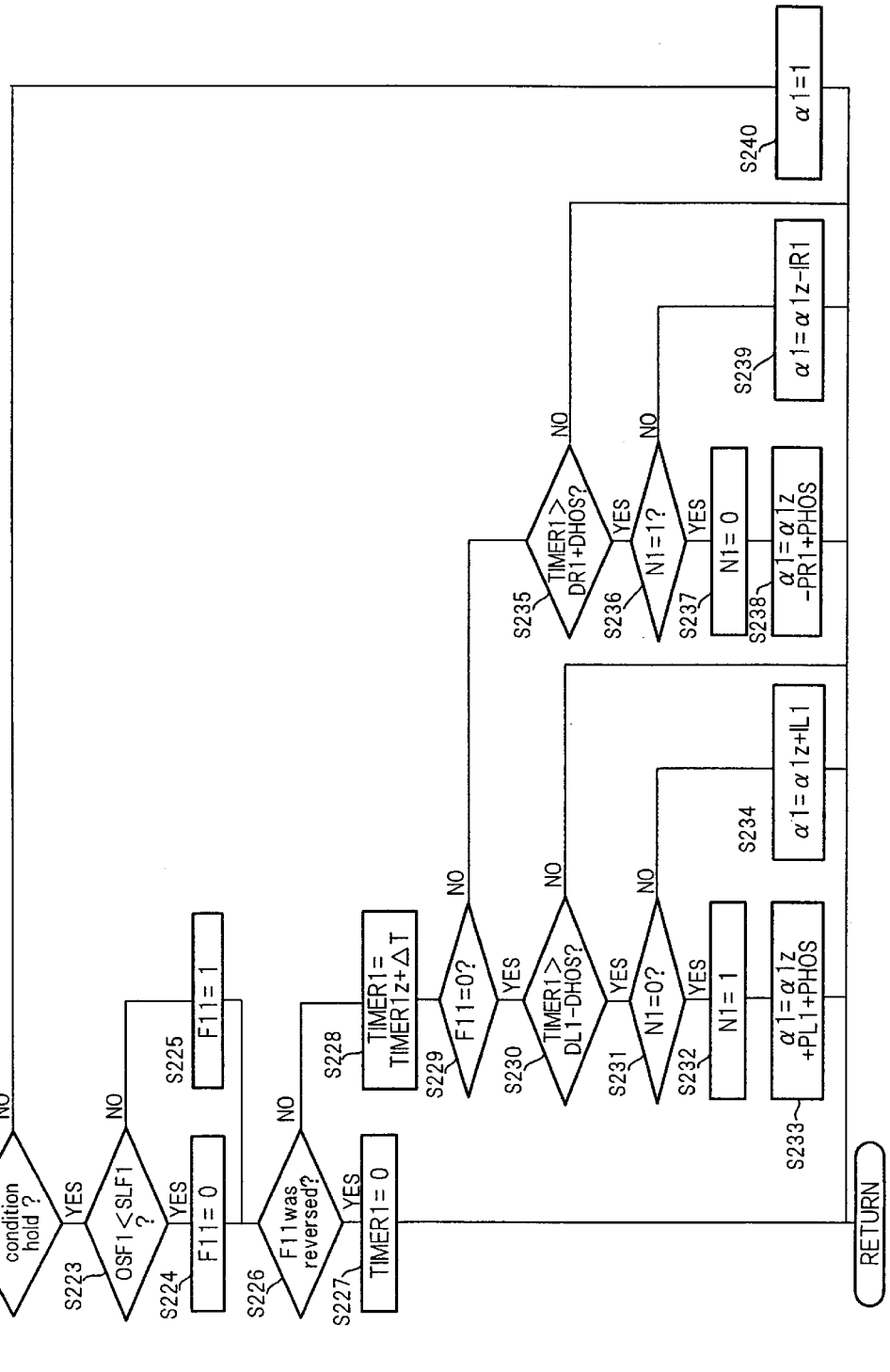
FIG. 9 is a flowchart for computing a correction coefficient of a first cylinder group in air-fuel ratio control.

FIG. 9 is a routine (1) for computing the air-fuel ratio feedback correction coefficient $\alpha 1$ of the first cylinder group, and it is performed at an interval of 10 ms.

Here, the correction coefficient a 1 of the air-fuel ratio feedback control of the first cylinder group is computed, and the computed correction coefficient $\alpha 1$ is used in computing fuel injection amount and fuel injection tiring in the routine for computing Ti and TITM.

First, in S221, A/D conversion of the output of the first front $O_2$ sensor is performed, and an oxygen concentration signal OSF1 is calculated. In S222, it is determined whether or not feedback control conditions, i.e., F/B conditions, hold.

In this case, when all of the following conditions (1)–(3) hold, it is assumed that F/B conditions hold.
(1) the activation of the first and second front $O_2$ sensors is complete,
(2) a fuel increase coefficient COEF=1 (fuel increase controls immediately after engine startup are complete).
(3) The target equivalent ratio TFBYA=1 (the target air-fuel ratio is the stoichiometric air-fuel ratio)

Figure 18:
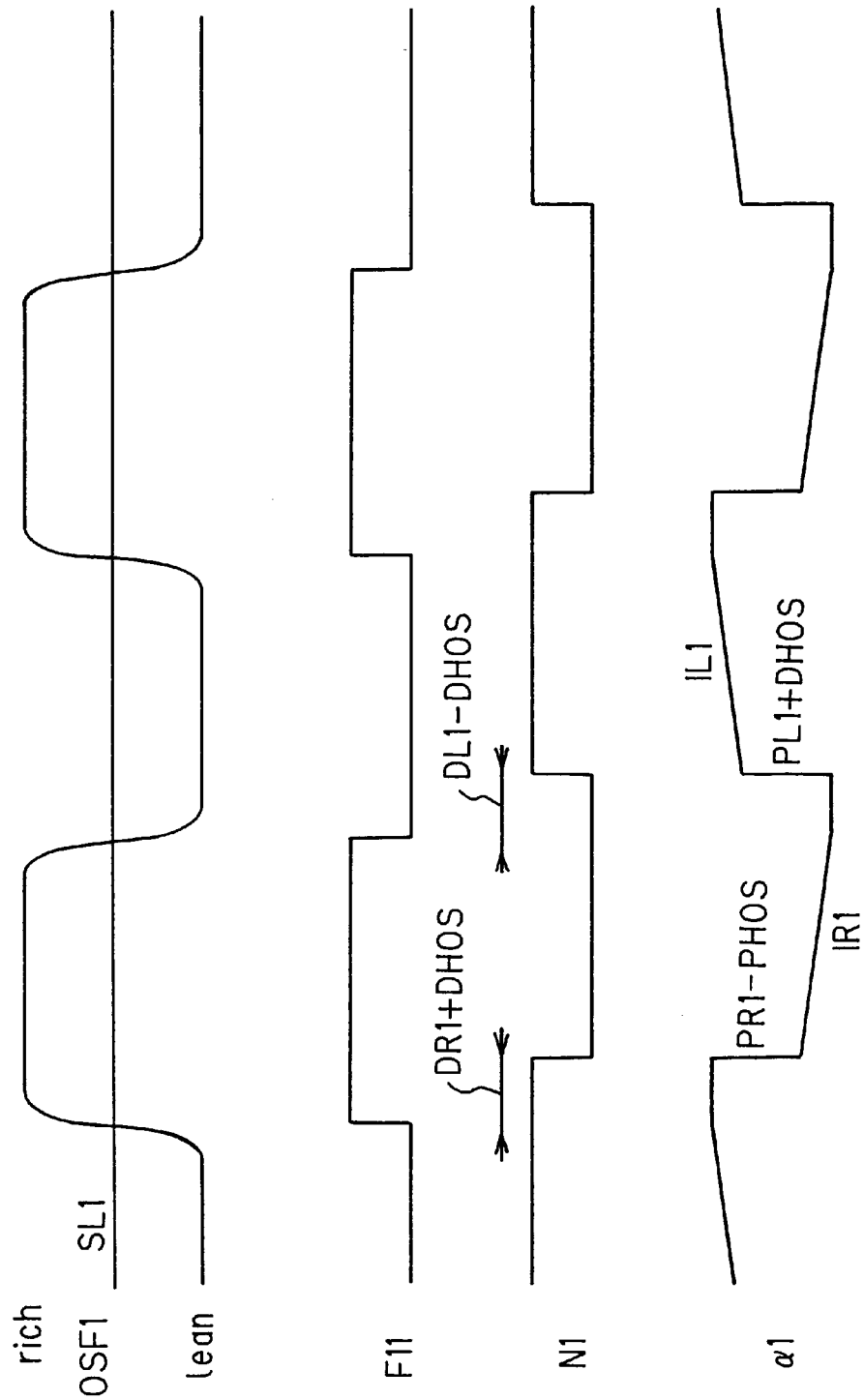
FIG. 18 is a time chart for describing a computing process of air-fuel ratio control.

When F/B conditions hold, as shown also in FIG. 18, the air-fuel ratio feedback correction coefficient $\alpha 1$ is computed as follows by proportional control using basic control constants (rich shift proportional gain PL1 and lean shift proportional gain PR1) and the correction value PHOS, integral control using basic control constants (rich shift integral gain IL1 and lean shift integral gain IR1, and delay time control using basic control constants (rich shift delay time DL1, lean shift delay time DR1) and the correction value DHOS, based on the result of comparing the oxygen concentration signal OSF1 and a slice level SLF1 in S223.

Specifically, when OSF1<SLF1 in S223, an air-fuel ratio inversion flag F11 is set to 0 in S224, otherwise the flag F11 is set to 1 in S225.

In S226, it is determined whether or not F11 was reversed, and if it was, a timer TIMER1 is set to 0 in S227.

On the other hand, when it was not reversed, the routine proceeds to S228, the timer TIMER1 is incremented, and TIMER1 is set to TIMER1z+$\Delta$T. The subscript z denotes the value on the immediately preceding occasion (value computed 10 ms earlier).

In S229, it is determined whether or not the flag F11=0, and when it is 0, it is determined whether or not the timer TIMER1>DL1−DHOS in S230. DL1 is a rich shift delay time, and DHOS is a correction value.

According to this embodiment, as delay time control is not performed, the result of S230 is never NO, and the routine proceeds to S231.

In S231, it is determined whether or not N1=0, and if N1=0, N1 is set to 1 in S232, and the correction coefficient $\alpha 1$ is computed from $\alpha 1=\alpha 1z+PL1+PHOS$ in S233. On the other hand, when N1 is not 0 in S231, the routine proceeds to S234 and the correction coefficient $\alpha 1$ is computed as $\alpha 1=\alpha 1z+IL1$.

When F11 is not 0 in S229, the routine proceeds to S235 and subsequent steps.

In S235, it is determined whether or not TIMER1>DR1+DHOS, and when this relation holds, it is determined whether or not N1=1 in S236. If N1=1, N1 is set to 0 in S237, and the correction coefficient $\alpha 1$ is computed from $\alpha 1=\alpha 1z-PR1+PHOS$ in S238.

When N1 is not 1 in S236, the routine proceeds to S239 and $\alpha 1$ is computed from $\alpha 1=\alpha 1z-IR1$.

When F/B conditions do not hold, in S240, the correction coefficient $\alpha 1$ is clamped to a 1=1.

In this type of control, delay time control is not performed as described above, so the results of S230 and S235 are never NO, proportional control is performed immediately after inversion of the flag F11, and integral control is performed when the flag F11 is not inverted.

Figure 10:
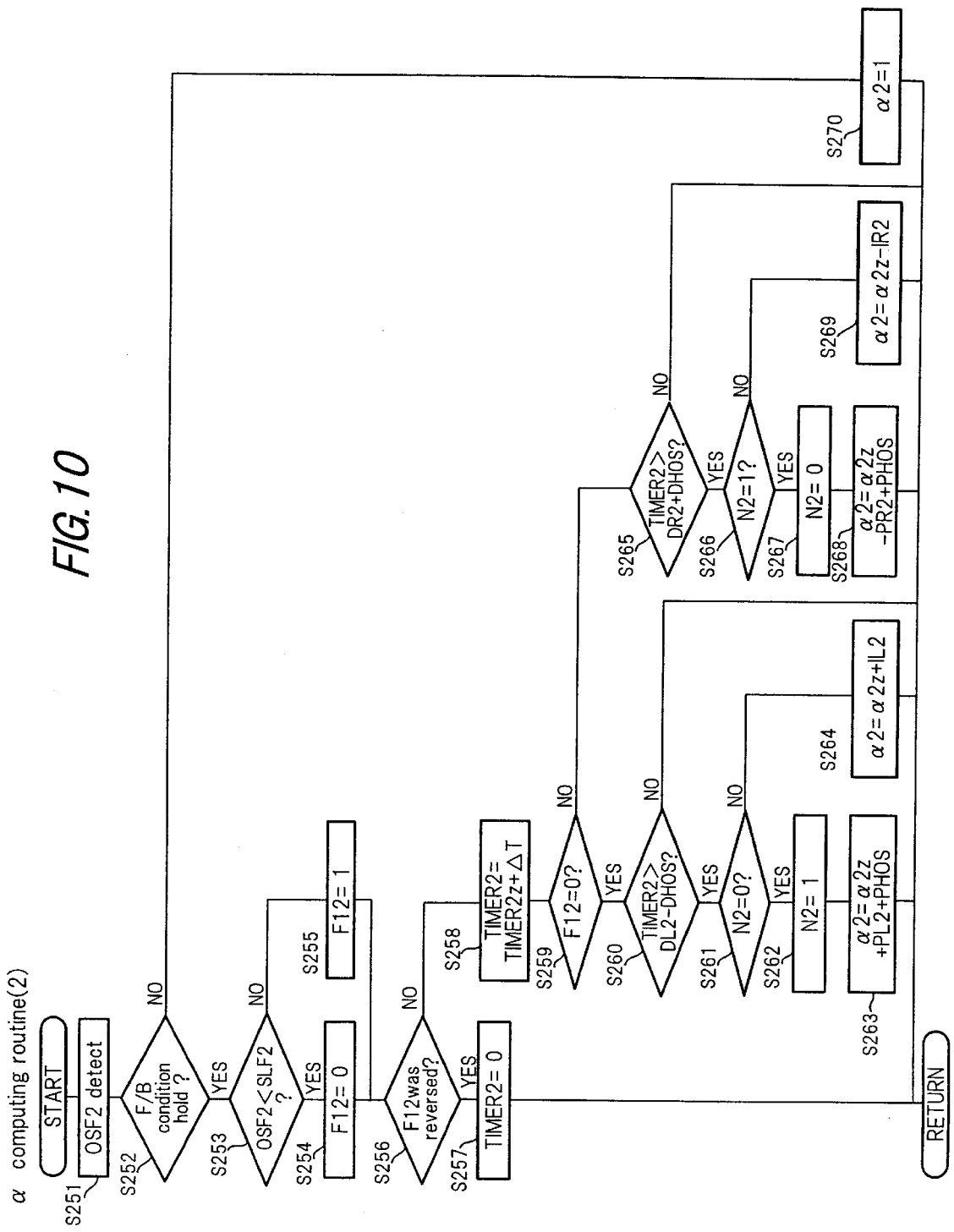
FIG. 10 is a flowchart for computing a correction coefficient of a second cylinder group in air-fuel ratio control.

Next, FIG. 10 is a routine (2) for computing the correction coefficient $\alpha 2$ of the second cylinder group, and this is performed at an interval of 10 ms.

Herein, when F/B conditions hold in S251–S253, the air-fuel ratio feedback correction coefficient $\alpha 2$ for the second cylinder group is computed in S254–S269 by proportional control using basic control constants (rich shift proportional gain PL2 and lean shift proportional gain PR2) and the correction value PHOS, integral control using basic control constants (rich shift integral gain IL2 and lean shift integral gain IR2), and delay time control using basic control constants (rich shift delay time DL2, lean shift delay time DM and the correction value DHOS, based on the result of comparing the oxygen concentration signal OSF2 and a slice level SLF2 in S223, as was described for the above FIG. 9. The control routine is the same as that for computing the correction coefficient $\alpha 1$ of the first cylinder group, so a detailed description here is omitted.

Figure 11:
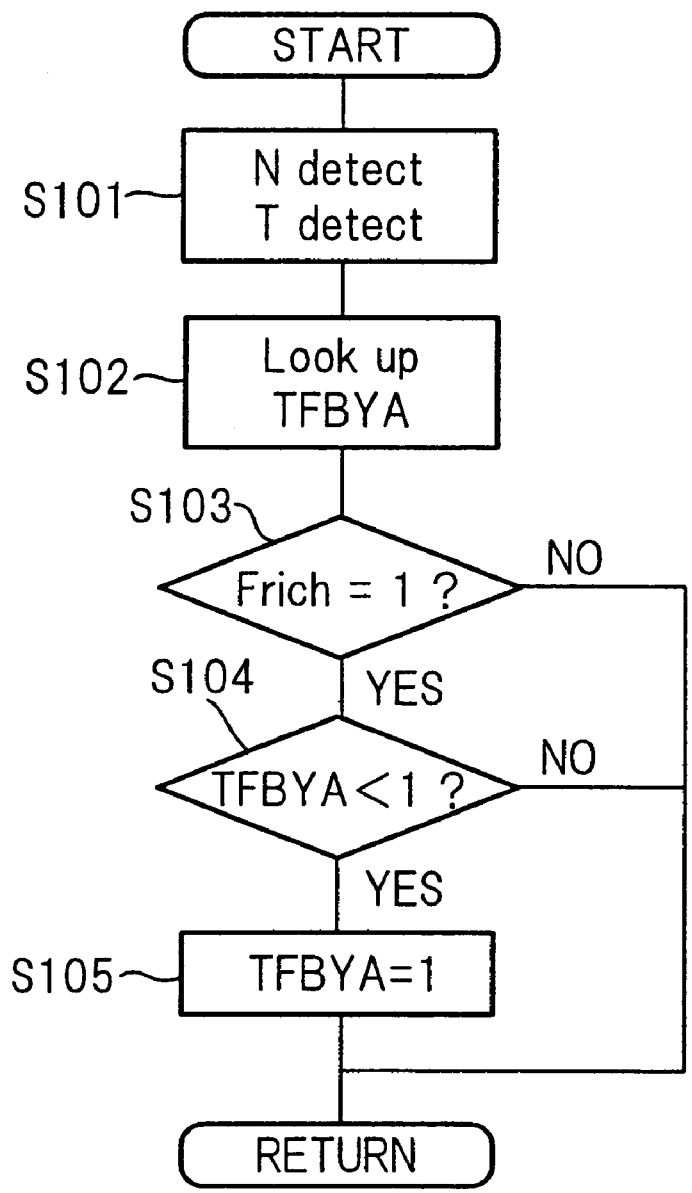
FIG. 11 is a flowchart for setting a target air-fuel ratio.

FIG. 11 is a routine (1) which sets a target air-fuel ratio, and this is performed at an interval of 10 ms.

Here, the target air-fuel ratio (target equivalent ratio) is set depending on the running conditions. This set target equivalent ratio is used for computing the fuel injection amount in a routine for computing the fuel injection amount, injection timing Ti and TITM, and also in other routines as a value representing the air-fuel ratio.

In S101, the engine rotation speed N is calculated based on the occurrence interval of a predetermined signal from the crank angle sensor, and the engine load T is calculated based on the output of the accelerator position sensor (for example, a target generation torque of the engine according to the accelerator depression amount).

In S102, the target equivalent ratio TFBYA is looked up based on the engine rotation speed N and engine load T from a target equivalent ratio setting map.

Here, target equivalent ratio=stoichiometric air-fuel ratio/target air-fuel ratio. Therefore, it is the stoichiometric air-fuel ratio when TFBYA is 1, a rich air-fuel ratio when TFBY>1 and a lean air-fuel ratio when TFBY<1. However, when TFBYA=1, rich shift control may be performed.

In S103, by determining whether or not the flag Frich=1, it is determined whether or not the conditions for performing rich shift of the air-fuel ratio are satisfied. Frich is a flag for performing SOx removal control of the rear catalyst. It is 1 when the conditions hold for shifting the air-fuel ratio to rich, and 0 when these conditions do not hold.

In S104, it is determined whether or not TFBYA which was looked up from a map is less than 1, and when it is less than 1, TFBYA is set to 1 in S105.

Therefore, by the processing of S103–S105, when the conditions for performing rich shift of the air-fuel ratio are satisfied, TFBYA is 1 even if the running conditions are in the lean air-fuel ratio running region. That is, once removal control has started, rich shift control is continued without migrating to lean running for as long as removal is possible (i.e., while the catalyst temperature is higher than the SOx discharge temperature).

Figure 12:
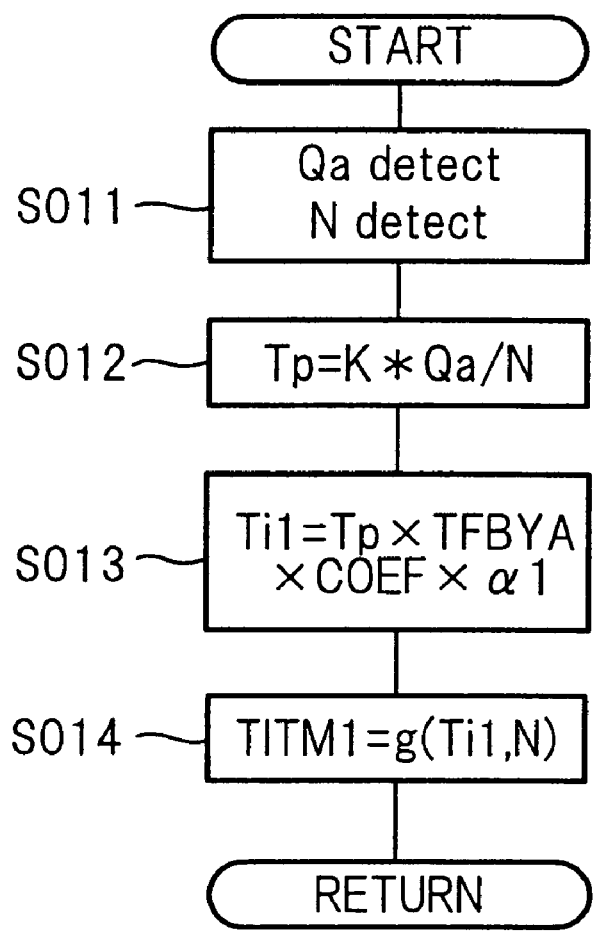
FIG. 12 is a flowchart for computing a fuel injection amount and fuel injection timing of the first cylinder group.

FIG. 12 is a routine (1) for computing fuel injection amount, fuel injection timing Ti and TITM, and it is performed at an interval of 10 ms.

Here, a fuel injection amount Ti1 and fuel injection timing TITM1 of the first cylinder group are computed. The computed Ti1 and TITM1 are stored in the memory of a control unit (ECM), and are read and used in the fuel injection routine which is performed in synchronism with the engine rotation.

For example, fuel injection is performed by applying a valve opening signal to a fuel injection valve which starts at a crank angle defined by TITM1, and continuing application of the valve opening signal for a time obtained by adding an ineffectual pulse width Ts to Ti1.

In S011, the output of an air flow meter is A/D converted to calculate an intake air amount Qa, and the engine rotation speed N is calculated based on the occurrence interval of a predetermined signal of the crank angle sensor.

In S012, based on these parameters, a basic injection amount Tp (fuel amount corresponding to stoichiometric air-fuel ratio) is computed as Tp=K*Qa/N where K is a coefficient.

In S013, this basic injection amount Tp is corrected by the target equivalent ratio TFBYA various fuel increase correction coefficients COEFs and the air-fuel ratio feedback correction coefficient $\alpha 1$ to compute the fuel injection amount Ti1, i.e., Ti1=Tp×TFBYA×COEF×$\alpha 1$.

COEF include a post-startup fuel increase correction coefficient and a water temperature increase correction coefficient, and when engine warmup is complete, COEF=1.

In S014, the fuel injection timing TITM1 is computed based on the computed Ti1 and engine rotation speed N.

According to this embodiment, it is desired to achieve stratified combustion when running at a lean air-fuel ratio, and uniform combustion when running at the stoichiometric air-fuel ratio or a rich air-fuel ratio. To obtain stratified combustion during lean running, the fuel injection timing TITM1 is set in the compression stroke, and to obtain premixed combustion when running at the stoichiometric air-fuel ratio or a rich air-fuel ratio, the fuel injection timing TITM1 is set in the intake stroke.

Figure 13:
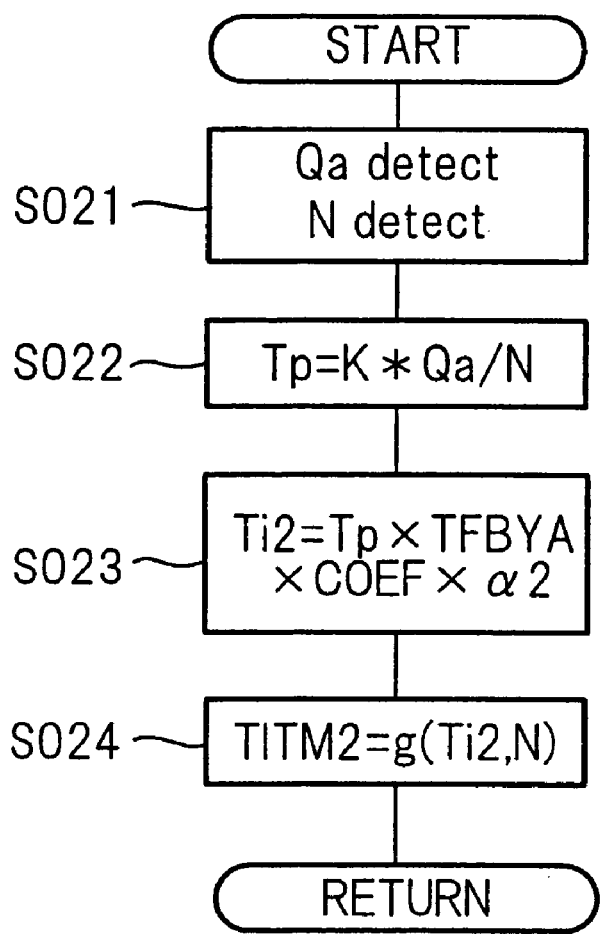
FIG. 13 is a flowchart for computing a fuel injection amount and fuel injection timing of the second cylinder group.

FIG. 13 is a routine (2) for computing the fuel injection amount, fuel injection timing Ti and TITM, and it is performed at an interval of 10 ms.

Here, a fuel injection amount Ti2 and fuel injection timing TITM2 of the second cylinder group are computed.

Regarding the specific details of this control, except that a 2 is used instead of $\alpha 1$ as a correction coefficient, the control is the same as that of the first cylinder group shown in FIG. 12 described above, and a detailed description here is omitted.

Figure 14:
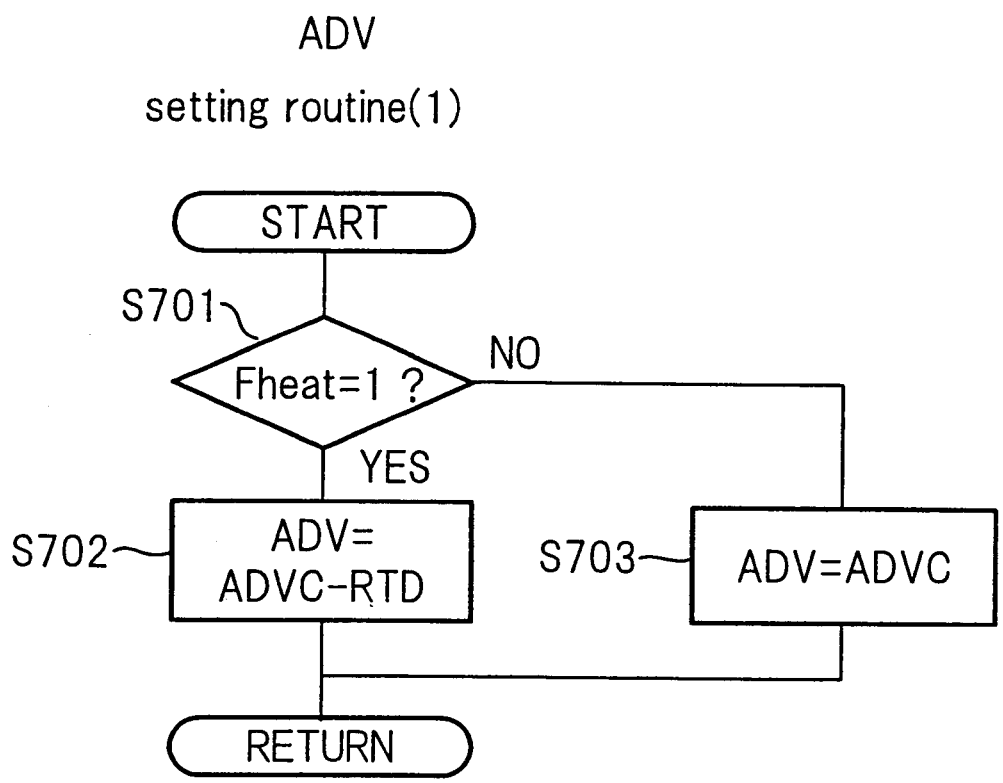
FIG. 14 is a flowchart for setting a retardation angle of an ignition tiring.

FIG. 14 is a routine (1) for setting an ignition timing ADV, and it is performed at an interval of 10 ms.

Here, the ignition timing ADV is set based on the flag Fheat, and based on the set ADV, an ignition signal is output to the spark plug by an ignition control routine, not shown.

For this purpose, firstly in S701, it is determined from the flag Fheat whether or not the conditions for raising the temperature of the rear catalyst hold. When temperature increase control should be performed, the routine proceeds to S702, and the ignition timing ADV is computed by subtracting a predetermined retardation angle correction value RTD from an ignition timing ADVC preset according to running conditions (engine rotation speed N and engine load 7). When temperature increase is not performed, the ignition timing ADV is set to ADVC in S713.

Here, ADVC is set for example as a timing at which the engine output is maximized provided that knocking does not occur.

When the ignition timing is thus retarded, the combustion timing is delayed so the exhaust gas temperature is increased.

Figure 15:
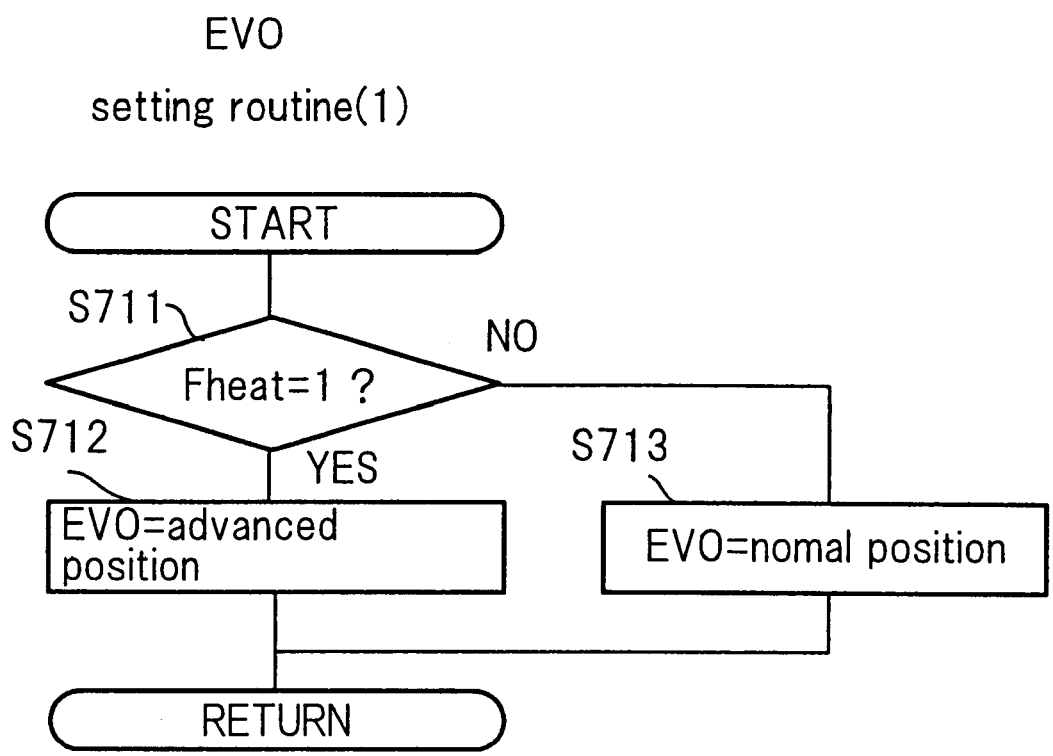
FIG. 15 is a flowchart for setting an opening timing of an exhaust valve.

FIG. 15 is a routine (1) for setting an opening timing EVO of the exhaust valve, and it is performed at an interval of 10 ms.

Here, the opening timing EVO of the exhaust valve is set based on the flag Fheat, and a drive signal is output to a valve control mechanism by a dynamic valve control routine, not shown, so as to obtain the set EVO.

Specifically, in S711, it is first determined from Fheat whether or not the conditions for increasing the temperature of the rear catalyst hold.

When temperature increase control is performed, in S712, the exhaust valve opening timing EVO is set to a position advanced to the usual timing. On the other hand, when temperature increase control is not performed, EVO is set to the usual position in S713.

In this case, when the exhaust gas valve opening timing is advanced, gas from the combustion chamber at the end of the expansion stroke flows into the exhaust gas passage, so the exhaust gas temperature rises.

FIG. 16 is a routine for setting a valve aperture of the EGR valve, and it is performed at an interval of 10 ms.

Here, the EGR valve aperture is determined from the flag Fheat, and a driving signal is output to the EGR valve at a routine not shown.

Specifically, in S731, it is first determined from flag Fheat whether or not the conditions for increasing the temperature of the rear catalyst hold. When the temperature increasing control is performed, in S732, the EGR valve aperture EGR is set to 0 to prevent a EGR gas from circulating to the intake passage by closing the EGR valve. On the other hand, when the temperature increasing control is not performed, the EGR aperture EGR is set to a predetermined value EGRC based on the running conditions (engine rotation speed, engine load ). In this case, an exhaust gas temperature rises due to increasing of a combustion temperature when the EGR gas circulation is stopped.

Figure 19:
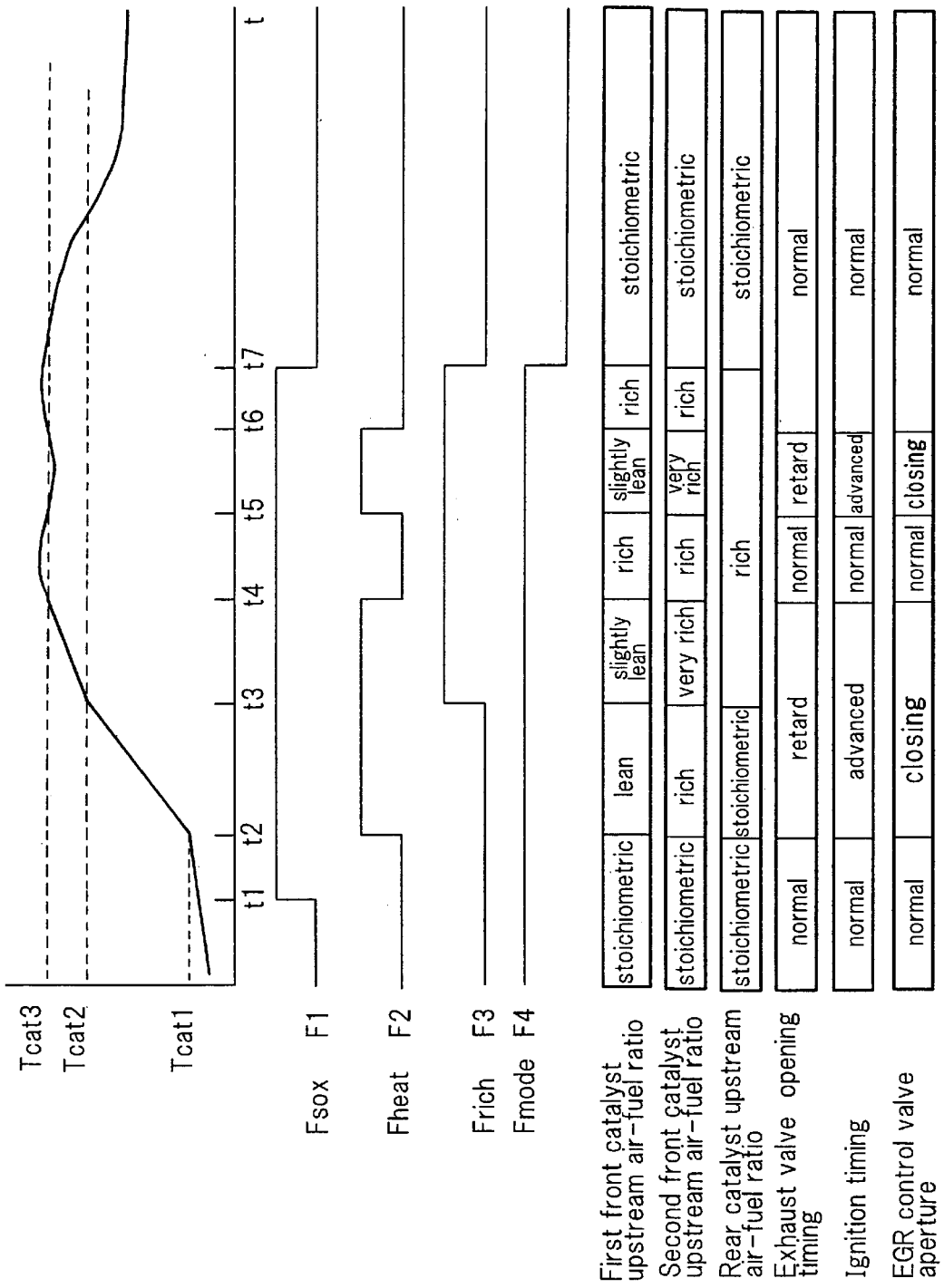
FIG. 19 is a time chart showing a relation between a rear catalyst temperature and air-fuel ratio control.

The elimination of SOx from the rear catalyst when the above controls are performed will now be described referring to the time chart of FIG. 19.

In order to simplify the description, it will be assumed that the running conditions are in region A of FIG. 2, and that Fmode=1 (the first mode wherein the first front catalyst is lean and the second front catalyst is rich during temperature increase control).

It will be assumed that the SOx which has been absorbed and accumulated by the rear catalyst has reached a predetermined amount, and the conditions for discharging hold (Fsox=1) at a time t1, as shown in the figure.

During an interval t1–t2, the first front catalyst temperature Tcat1 is low, and the conditions for increasing the temperature of the rear catalyst do not hold (Fheat=0). Ordinary control is therefore performed with the air-fuel ratio at the stoichiometric air-fuel ratio, and the system waits for the catalyst temperature to rise under ordinary control. It should be noted that when the vehicle is run at the stoichiometric air-fuel ratio during ordinary control, the average air-fuel ratios of both the first and second cylinder groups are controlled to the stoichiometric air-fuel ratio.

During an interval t2–t3, temperature increase conditions are satisfied (Fheat=1) and due to the setting of PL1 and PR1, the average air-fuel ratio of the exhaust led to the first front catalyst (average air-fuel ratio of the first cylinder group) is shifted to lean from the stoichiometric air-fuel ratio.

In this period, the purifying efficiency of the first front catalyst falls, and excess oxygen flows through the first front catalyst.

Also, due to the setting of PL2 and PR2, the average air-fuel ratio of the exhaust led to the second front catalyst (average air-fuel ratio of the second cylinder group) is shifted to rich from the stoichiometric air-fuel ratio. Therefore, the purifying efficiency of the second front catalyst falls, and excess unburnt fuel components flow through the second front catalyst.

In this case, as the catalytic reactions in both of the front catalysts is suppressed, the temperatures of both the front catalysts do not rise, however the lean exhaust gas and rich exhaust gas which have flowed through the front catalysts react in the rear catalyst, and the temperature of the rear catalyst therefore rises.

Here, due to the setting of PHOSPLS, PHOSPRS, PHOSILS and PHOSIRS, the value of PHOS is a value at which the average air-fuel ratio of the exhaust gas led to the rear catalyst is the stoichiometric air-fuel ratio, and the average air-fuel ratio of the exhaust led to the rear catalyst is effectively the stoichiometric air-fuel ratio. In other words, the amount of excess oxygen flowing through the first front catalyst and the amount of excess unburnt fuel components flowing through the second front catalyst are substantially the same (exactly the amounts necessary for reaction), and the catalytic reaction in the rear catalyst is therefore performed most efficiently.

Therefore, the temperature increase effect on burnt fuel in the rear catalyst can be maximized. Also, by performing retardation angle control of the ignition timing, advance angle control of the exhaust valve opening timing and closing control of EGR valve aperture, exhaust gas temperature is increased and the temperature rise of the rear catalyst is assisted.

During an interval t3–t4, as the temperature Tcat of the rear catalyst has reached a SOx discharge temperature Tcat2, Frich=1, and due to the setting of PHOSPLR, PHOSPRR, PHOSILR and PHOSIRR, the value of PHOS is a value at which the average air-fuel ratio of the exhaust led to the rear catalyst is shifted to rich. The average air-fuel ratio of the exhaust led to the rear catalyst is therefore shifted to rich from the stoichiometric air-fuel ratio.

Due to this rich shift, the discharge of SOx which was absorbed and deposited by the rear catalyst is promoted, and reduction purification of the discharged SOx is performed by unburnt fuel in the rear catalyst.

In the first cylinder group, as the lean shift due to PL1 and PR1 and the rich shift due to PHOS are performed simultaneously, the lean shift is less than during the period t2–t3. Likewise in the second cylinder group, as the rich shift due to PL2 and PR2 and the rich shift due to PHOS are performed simultaneously, the rich shift is larger than during the period t2–t3.

For this reason, although the amount of excess unburnt fuel led to the rear catalyst increases, the amount of excess oxygen decreases and the temperature increase effect of the rear catalyst is less than during the period t2–t3. However although the temperature increase effect is less, there is no problem as the SOx discharge temperature has already been reached, and the temperature rises gradually which is desirable from the viewpoint of durability of the rear catalyst.

During an interval t4–t5, as the rear catalyst temperature Tcat has reached a predetermined upper limiting value Tcat3, Fheat=0, and by setting PLS,PRS, rich shift and lean shift control for each cylinder group is stopped. However, since the rich shift due to the setting of PHOSPLR, PHOSPRR, PHOSILR and PHOSIRR continues, the average air-fuel ratio of both cylinder groups is shifted to rich from the stoichiometric air-fuel ratio.

Due to this, excessive temperature rise of the rear catalyst above Tcat3 is suppressed, and catalyst durability is ensured.

During an interval t5–t6, the rear catalyst temperature falls to Tcat3 or below, so temperature increasing control and SOx discharge and reduction are performed again. The details of this control are identical to those of the control performed during the interval t3–t4.

During an interval t6–t7, the catalyst temperature Tcat reaches an upper limiting value Tcat during SOx discharge/reduction control, so to suppress further temperature rise, the flag Fheat is set to 0 and the same control is performed as during the interval t4–t5.

At a time t7, the flag Fsox=0, and discharge of SOx deposited on the rear catalyst is complete. SOx removal control of the rear catalyst is therefore terminated, and the routine returns to ordinary air-fuel ratio control.

When SOx removal is performed in the rear catalyst, the air-fuel ratios are lean and rich in the two front catalysts and temperature rise due to catalytic reactions is suppressed. Hence, temperature increase in the rear catalyst is performed effectively while maintaining durability of the front catalysts, and a satisfactory SOx discharge/reduction effect is achieved.

While Fmode=0 and temperature increase control is performed, the average air-fuel ratio of the first cylinder group is rich and the average air-fuel ratio of the second cylinder group is lean, the remaining features being essentially identical to those described above. When the first and second modes are changed over, the air-fuel ratios of the exhaust gas flowing into the first and second front three-way catalysts are alternately changed over between rich and lean, so catalyst deterioration is subject to the same conditions on both sides and the durability of the catalyst is enhanced.

Next, a second embodiment will be described.

In this embodiment, only the air-fuel ratio control value setting routine is different from that of the first embodiment.

Figure 20:
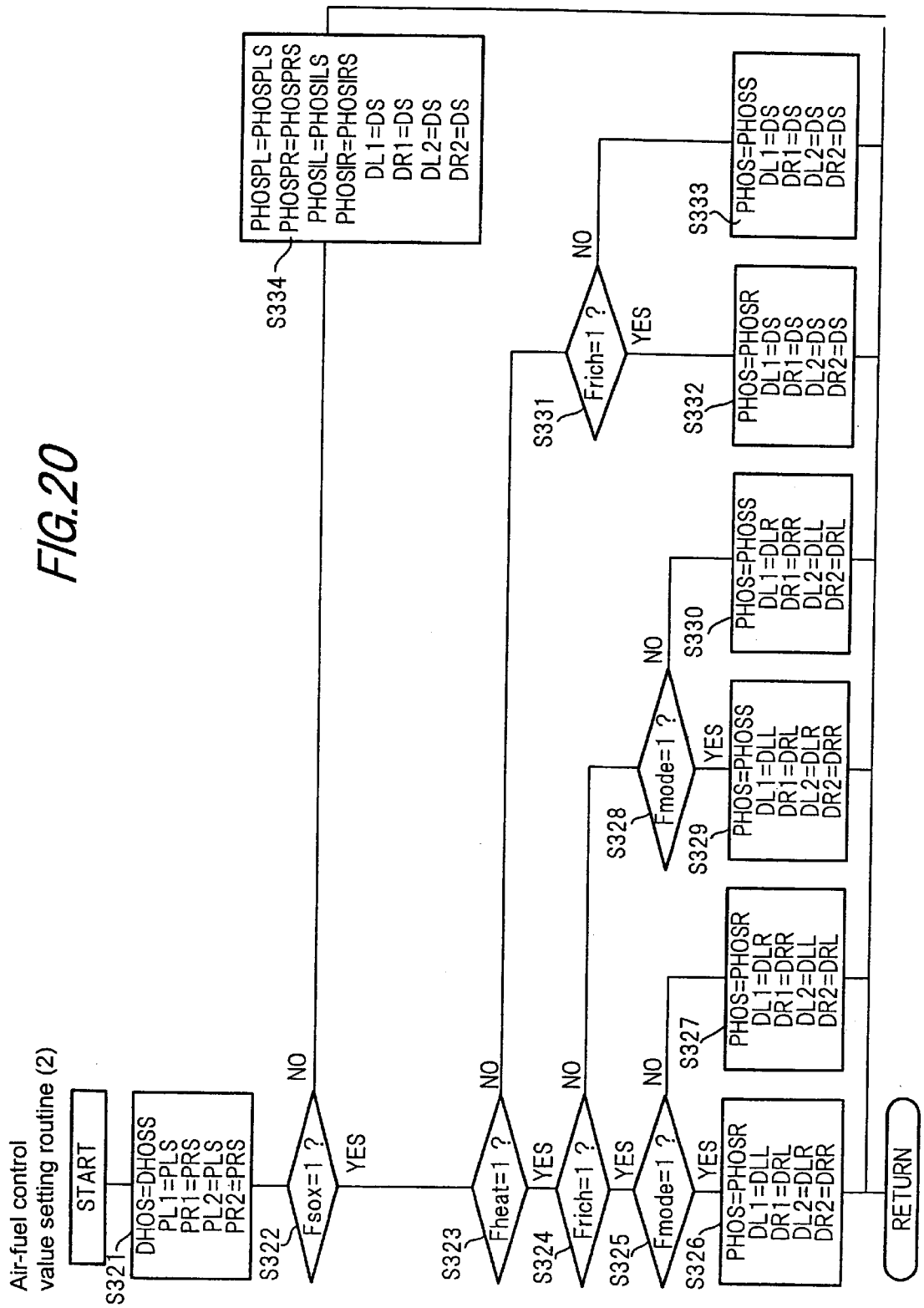
FIG. 20 is a flowchart for setting an air-fuel ratio control value according to a second embodiment.

FIG. 20 is a routine (2) for setting an air-fuel ratio control value, and it is performed at an interval of 10 ms.

The basic control constants DL1, DR1, DL2 and DR2, and the correction value PHOS, are set based on the flags Fsox, Fheat, Frich and Fmode. However according to this embodiment, the difference from the first embodiment is that whereas the value of the correction value PHOS is computed based on the rear $O_2$ sensor output during ordinary running when the conditions for discharging SOx absorbed by the rear catalyst do not hold, the value of PHOS is set by open control when they do hold.

Consequently, according to this embodiment, rear F/B conditions of the PHOS computing routine are as follows:
(1) The activation of the rear $O_2$ sensor is complete.
(2) F/B conditions of the front $O_2$ sensor hold.
(3) SOx discharge conditions do not hold (Fsox-0).

DL1, DR1 are basic control constants of delay time control when the correction coefficient α1 of air-fuel ratio feedback control of the first cylinder group is computed based on the first front $O_2$ sensor output. The rich shift delay time DL1 sets the delay time from when the first front $O_2$ sensor output inverts from rich to lean, to when rich shift proportional control is performed, and the lean shift delay time DR1 sets the delay time from when the first front $O_2$ sensor output inverts from lean to rich, to when lean shift proportional control is performed. When DL1>DR1, the control midpoint (=average air-fuel ratio of exhaust gas led to the first front catalyst) is shifted to lean, and when DLl<DR1, the control midpoint value is shifted to rich.

DL2, DR2 are basic control constants of delay time control when the correction coefficient α2 of air-fuel ratio feedback control of the second cylinder group is computed based on the second front $O_2$ sensor output. The rich shift delay time DL2 sets the delay time from when the second front $O_2$ sensor output inverts from rich to lean, to when rich shift proportional control is performed, and the lean shift delay time DR2 sets the delay time from when the second front $O_2$ sensor output inverts from lean to rich, to when lean shift proportional control is performed. When DL2>DR2, the control midpoint value (=average air-fuel ratio of exhaust gas led to the second front catalyst) is shifted to lean, and when DL2<DR2, the control midpoint value is shifted to rich.

DHOS is a correction value of delay time control, but according to this embodiment, this value is set to a fixed value and the delay time control correction is not performed. Also, by setting the values of the basic control constants PL1, PL2 of proportional control to PLS, and setting the values of PR1, PR2 to PRS, a rich/lean shift for each cylinder group is not generated. The set DL1, DR1, DL2, DR2 and PHOS are used by the routine for computing the correction coefficient a.

The set PHOSPL, PHOSPR, PHOSIL and PHOSIR are used by the routine for computing the correction value PHOS.

In S321, DHOS=DHOSS (it may be 0), PL1=PLS, PR1=PRS, PL2=PLS and PR2=PRS are respectively set, and in S322, it is determined whether SOx discharge conditions hold from the flag Fsox.

When it is determined that these conditions hold, temperature rise is determined from Fheat in S323, rich shift is determined from Frich in S324 and air-fuel ratio mode is determined from Fmode in S325, respectively, and when all of these are affirmative, the routine proceeds to S326.

In S326, the value PHOSR is first set to PHOS. PHOSR is the value by which the average air-fuel ratio of the exhaust led to the rear catalyst is shifted to rich from the stoichiometric air-fuel ratio. PHOSR is stored in a memory (ROM) as a single fixed value or as plural fixed values depending on the engine rotation speed and the load. Alternatively, PHOSR may be variably set according to the SOx discharge amount, and in this case is stored in an updatable memory (RAM).

Also, DL1 and DR1 are set to the values DLL, DRL. DLL, DRL are values which shift the average air-fuel ratio of the exhaust led to the first front catalyst to lean from the stoichiometric air-fuel ratio.

In general, DLL, DRL are in the relation DLL>DRL, and DRL may also be 0. Also, the values of DLL, DRL are set so that the lean shift due to DLL and DRL is larger than the rich shift due to PHOSR. As in the above-mentioned cases, DLL, DLR are stored in a memory (ROM) as single fixed values or as plural fixed values depending on the engine rotation speed and the load.

Further, DL2 and DR2 are set to the values DLR, DRR. DLL, DRL are values which shift the average air-fuel ratio of the exhaust led to the second front catalyst to rich from the stoichiometric air-fuel ratio.

In general, DLR, DRR are in the relation DLR<DRR, and DLL may also be 0. DLR, DRR are stored in a memory (ROM) as single fixed values or as plural fixed values depending on the engine rotation speed and the load.

The values of DLL, DRL, DLR and DRR are set so that when air-fuel ratio feedback control of the first and second cylinder groups is performed using only DL1, DR1, DL2 and DR2 (i.e., when the correction value PHOS=0), the average air-fuel ratio of the combined exhaust gases is equal to the stoichiometric air-fuel ratio.

When Fmode is not 1 in S325, PHOS is first set to the value PHOSR in S327. Also, DL1, DR1 are set to the values DLR, DRR, and DL2, DR2 are set to the values DLL, DRL.

Due to this, the exhaust gas air-fuel ratio of the first front catalyst is rich, and the exhaust gas air-fuel ratio of the second front catalyst is lean.

When Frich is not 1 in S324, it is determined whether or not Fmode=1 in S328, and if the result is affirmative, PHOS is set to the value PHOSS in S329.

Here, PHOSS is a value at which the average air-fuel ratio of the exhaust gas led to the rear catalyst is the stoichiometric air-fuel ratio. PHOSS is stored in a memory (ROM) as a single fixed value or as plural fixed values depending on the engine rotation speed and the load.

As the values of DLL, DRL, DLR and DRR are set so that the average air-fuel ratios of the combined exhaust gases is equal to the stoichiometric air-fuel ratio when air-fuel ratio feedback control of the first and second cylinder groups is performed only by DL1, DR1, DL2 and DR2, PHOSS may be set to 0. Alternatively, the average value of PHOS computed during air-fuel ratio feedback control of using rear $O_2$ sensor may be used as PHOSS.

Further, DL1, DR1 are set to the values DLL, DRL, and DL2, DR2 are set to the values DLR, DRR.

In S330, PHOS is set to the value PHOSS. Also, DL1, DR1 are set to the values DLR, DRR, and DL2, DR2 are set to the values DLL, DRL.

When Fheat is not 1 in S323, the routine proceeds to S331 and it is determined whether or not Frich=1. When the result is affirmative, the routine proceeds to S332.

In S332, PHOS is set to the value PHOSR, and DL1, DR1 are set to a value DS. By making DL1 and DR1 equal in this way, a shift of the air-fuel ratio due to an imbalance of delay time control does not occur, and if there is no imbalance of proportional control, the average air-fuel ratios of the exhaust gases led to the front catalysts will be equal to the stoichiometric air-fuel ratio.

Here, DS is stored in a memory (ROM) as a single value or as plural values depending on the engine rotation speed and the load. The value of DS may be 0, or it may be set to a control period of the same order as DLL, DRL, DLR and DRR when air-fuel ratio feedback control is performed.

Likewise, DL2, DR2 are set to the value DS.

In S333, PHOS is set to the value PHOSS. Further, DL1, DR1 are set to the value DS, and DL2, DR2 are set to the value DS.

In S334, when SOx removal control is not performed, i.e., during ordinary running, dual $O_2$ sensor feedback control is performed by the rear $O_2$ sensors, and basic control constants for this feedback control are set. Specifically, PHOSPL=PHOSPLS, PHOSR=PHOSRS, PHOSIL=PHOSILS and PHOSIR=PHOSIRS. Further, DL1, DR1 are set to the value DS, and DL2, DR2 are set to the value DS.

Here, when the air-fuel ratio is shifted by air-fuel ratio feedback control, there is an advantage in that the shift amount is more stable than if the air-fuel ratio were shifted by air-fuel ratio open control.

Figure 22:
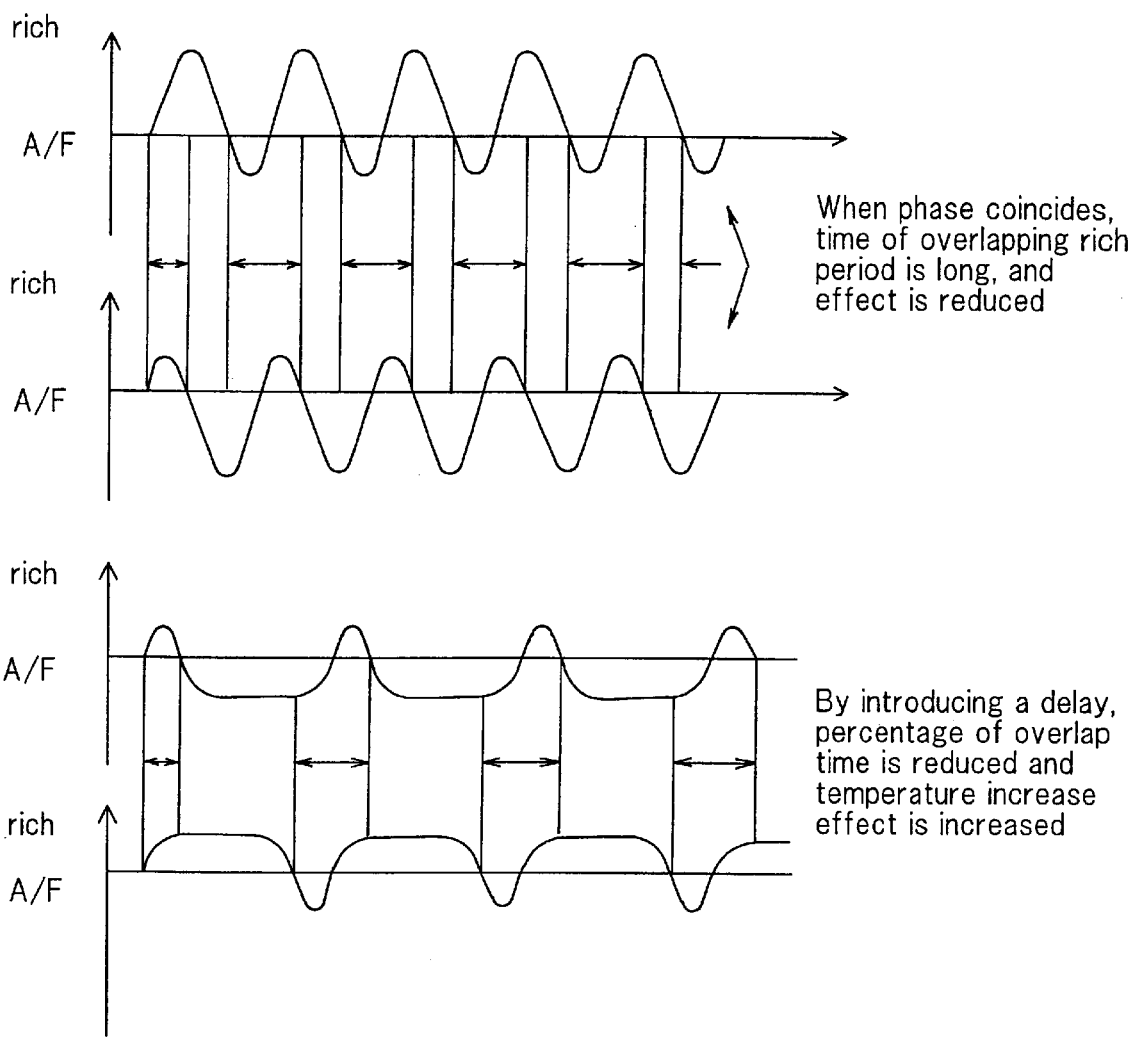
FIG. 22 is a descriptive drawing showing an air-fuel ratio fluctuation of the first and second cylinder groups.

However when the air-fuel ratio is shifted by air-fuel ratio feedback control, although the average air-fuel ratio is shifted to rich or lean from the stoichiometric air-fuel ratio, the instantaneous air-fuel ratio momentarily oscillates to rich and lean on either side of the stoichiometric air-fuel ratio, as also shown in FIG. 22.

For this reason, even when a lean shift of the first cylinder group and a rich shift of the second cylinder group are performed, for example, a moment occurs when exhaust gas leaner than the stoichiometric air-fuel ratio is discharged from both cylinder groups, and a moment when exhaust gas richer than the stoichiometric air-fuel ratio is discharged from both cylinder groups. The rear catalyst has the ability to store excess oxygen in the exhaust gas, so there is no problem if there is some overlap of a lean or rich air-fuel ratio. Nevertheless, if this lean or rich overlap were to continue for a long period of time, there is a possibility that the temperature increase efficiency of the rear catalyst would be correspondingly less.

However when delay time control is performed on the rich and lean shift of the first and second cylinder groups as in the case of this embodiment, the lean exhaust gas or rich exhaust gas overlap time is shortened as compared with the first embodiment where proportional control was performed, as shown by the lower part of FIG. 22, and it is therefore easy to ensure good temperature increase efficiency in the rear catalyst.

When the air-fuel ratio is shifted by delay time control of air-fuel ratio feedback control, in addition to the setting of a delay time such as DL1, a limit may be set on the delay time by a rich surface area equivalent amount or a lean surface area equivalent amount of the correction coefficients α1, α2.

Figure 21:
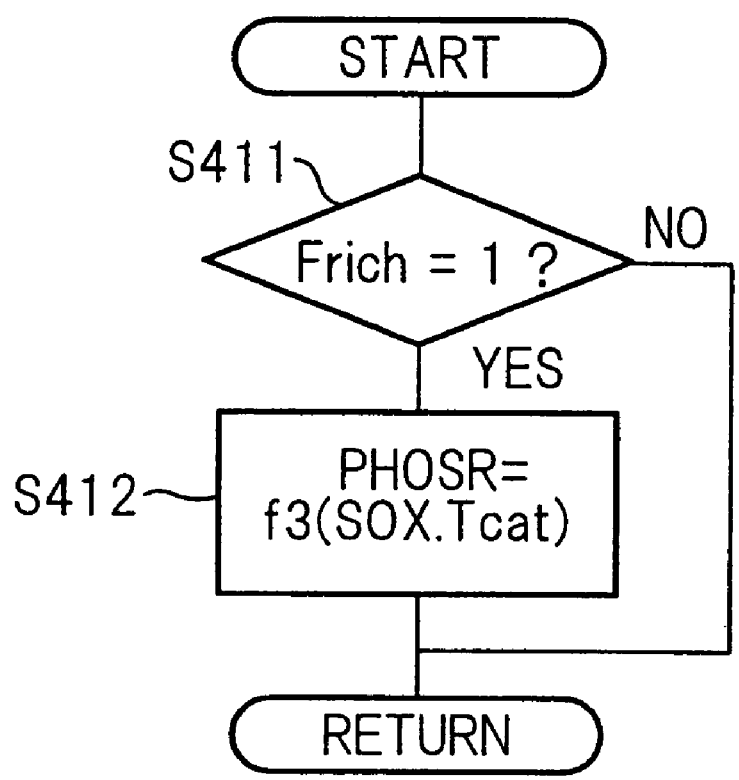
FIG. 21 is a flowchart for setting a basic control constant.

FIG. 21 is a PHOSR setting routine (1), and it is performed at an interval of 10 ms. This is used when PHOSR of the air-fuel ratio control value setting routine (2) is set variably in conjunction with the SOx discharge amount.

In S411, it is determined whether or not the conditions hold for enriching the air-fuel ratio, i.e., whether or not Frich=1. When these conditions hold, the value of PHOSR is computed by a function $f3$ in S412.

The function f3 is here determined so that the degree of rich shift has the following characteristics relative to various parameters.

(1) The degree of rich shift is smaller the smaller the SOx discharge amount in the rear catalyst, and is 0 when SOx is 0.
(2) The degree of rich shift is smaller the lower the catalyst temperature, and is 0 when the catalyst temperature is below the SOx discharge temperature.

The air-fuel ratio is enriched according to the SOx amount absorbed and deposited by the rear catalyst, so there is no unnecessary enrichment of the air-fuel ratio and fuel consumption losses are reduced.

Next, a third embodiment will be described. According to the third embodiment, the only difference from the first embodiment is the air-fuel ratio control value setting routine.

FIG. 23 is an air-fuel ratio control value setting routine (3), and it is performed at an interval of 10 ms.

Herein, basic control constants DL1, DR1, DL2, DR2 and the correction values PHOS, DHOS are set based on the flags Fsox, Fheat, Frich and Fmode as described above.

According to this embodiment, under ordinary running conditions when the conditions for discharging SOx absorbed in the rear catalyst do not hold, the value of the correction PHOS is computed based on the output of the rear $O_2$ sensor, and when the conditions do hold, the value of PHOS is set by open control. As a result, according to this embodiment, the rear catalyst F/B conditions of the PHOS computing routine are as follows.

(1) Activation of the rear $O_2$ sensor is complete.
(2) F/B conditions of the front $O_2$ hold.
(3) The conditions for discharging SOx do not hold (Fsox=0).

The correction value DHOS is reflected in delay time control of air-fuel ratio feedback control, and changes the balance between rich shift delay time and lean shift delay time. When the value of DHOS is positive, the control midpoint value of air-fuel ratio feedback control is shifted to rich, and when the value of DHOS is negative, the control midpoint value is shifted to lean.

Also, by setting the values of PL1, PL2 to PLS, and the values of PR1, PR2 to PRS, it is arranged that a rich or lean shift for each cylinder group does not occur in proportional control.

The set DL1, DR1, DL2, DR2, PHOS and DHOS are used in the routine for computing the correction coefficient a, and PHOSPL, PHOSPR, PHOSIL and PHOSIR which were similarly set are used in the routine for computing PHOS.

Steps S341–S345 are the same as those of the air-fuel ratio control value setting routine (2) of the above-mentioned second embodiment, and are therefore omitted.

In S346, PHOS is first set to the value PHOSS, and DHOS is set to the value DHOSR. Here, DHOSR is a value which shifts the average air-fuel ratio of the exhaust gas led to the rear catalyst to rich from the stoichiometric air-fuel ratio. This DHOSR is stored by a memory (ROM) as a single fixed value or as plural fixed values depending on the engine rotation speed and the load. Alternatively, DHOSR may be varied with the SOx discharge amount, in which case a value is stored in a memory (RAM).

Further, DL1, DR1 are set to the values DLL, DRL, and DL2, DR2 are set to the values DLR, DRR.

In S347, the value PHOS is set to PHOSS, and the value DHOS is set to DHOSR. Further, DL1, DR1 are set to the values DLR, DRR, and DL2, DR2 are set to the values DLL, DRL. In S349, PHOS is set to the value PHOSS, and DHOS is set to the value DHOSS. Herein, DHOSS is a value at which the average air-fuel ratio of the exhaust led to the rear catalyst becomes the stoichiometric air-fuel ratio. DHOSS is stored by a memory (ROM) as a single fixed value or as plural fixed values depending on the engine rotation speed and the load. It is also possible to have DHOSS=0.

Further, DL1, DR1 are set to the values DLL, DRL, and DL2, DR2 are set to the values DLR, DRR.

In S350, PHOS is set to the value PHOSS, and DHOS is set to the value DHOSS. Further, DL1, DR1 are set to the values DLR, DRR, and DL2 and DR2 are set to the values DLL, DRL.

In S352, PHOS is set to the value PHOSR, and DHOS is set to the value DHOSS. Further, DL1, DR1 are set to the value DS, and DL2, DR2 are set to the value DS.

In S353, DHOS is set to the value DHOSS even if PHOS is set to the value PHOSS. Moreover, DL1, DR1 are set to the value DS, and DL2, DR2 are set to the value DS.

S354 relates to the control performed during normal running, and as dual $O_2$ sensor feedback control is performed by the first and second front $O_2$ sensors, a basic control constant of dual $O_2$ sensor feedback control is set as described earlier. That is, PHOSPL=PHOSPLS, PHOSR=PHOSRS, PHOSIL=PHOSILS, and PHOSIR=PHOSIRS. DHOS is then set to the value DHOSS. Further, DL1, DR1 are set to the value DS, and DL2, DR2 are set to the value DS.

Figure 24:
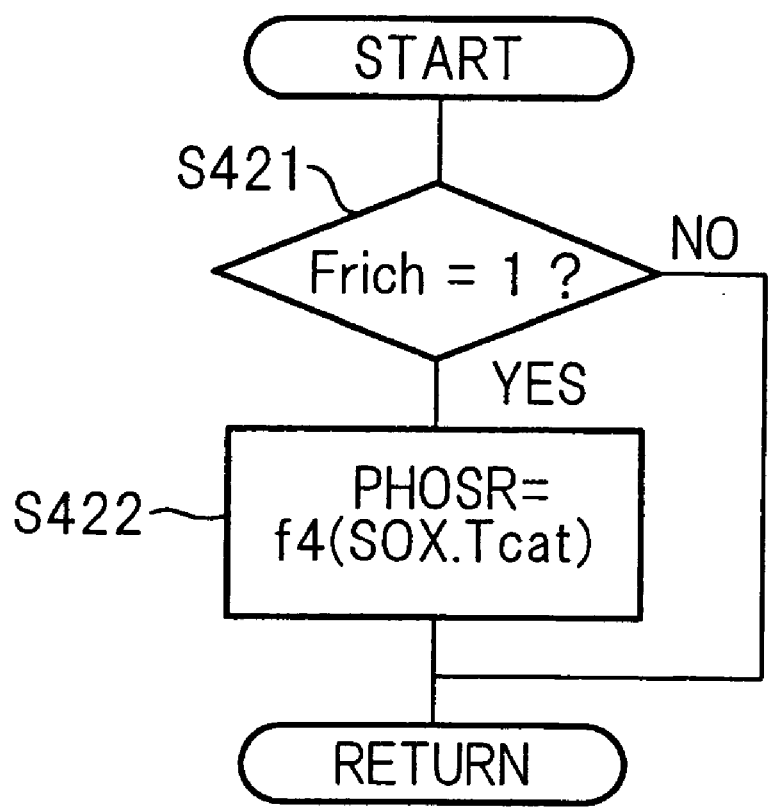
FIG. 24 is a flowchart for setting a basic control constant.

FIG. 24 is a DHOSR setting routine (1), and it is performed at an interval of 10 ms.

This is used when DHOSR in the aforementioned air-fuel ratio control value setting routine (3) is set to be variable in conjunction with the SOx discharge amount.

In S421, it is determined from the flag Frich whether or not the conditions hold for enriching the air-fuel ratio. When rich shift conditions hold, the value of DHOSR is computed by a function f4 in S422.

In this case, the function f4 is set so that the degree of rich shift has the following characteristics relative to each parameter. That is, the degree of rich shift becomes less the smaller the SOx discharge amount from the rear catalyst, and is 0 when the absorption amount is 0. Also, the degree of rich shift is less the lower the catalyst temperature, and is 0 at or below the SOx discharge temperature.

Therefore, according to this embodiment, rich shift of the air-fuel ratio is performed corresponding to the SOx discharge amount, and as the air-fuel ratio is not made rich unnecessarily, impairment of fuel-cost performance is avoided.

Next, a fourth embodiment will be described.

The fourth embodiment is different from the first-third embodiments only insofar as concerns the mode setting routine of the air-fuel ratio of the exhaust gas led to the first and second front catalysts, therefore the description will focus on this point.

Figure 25:
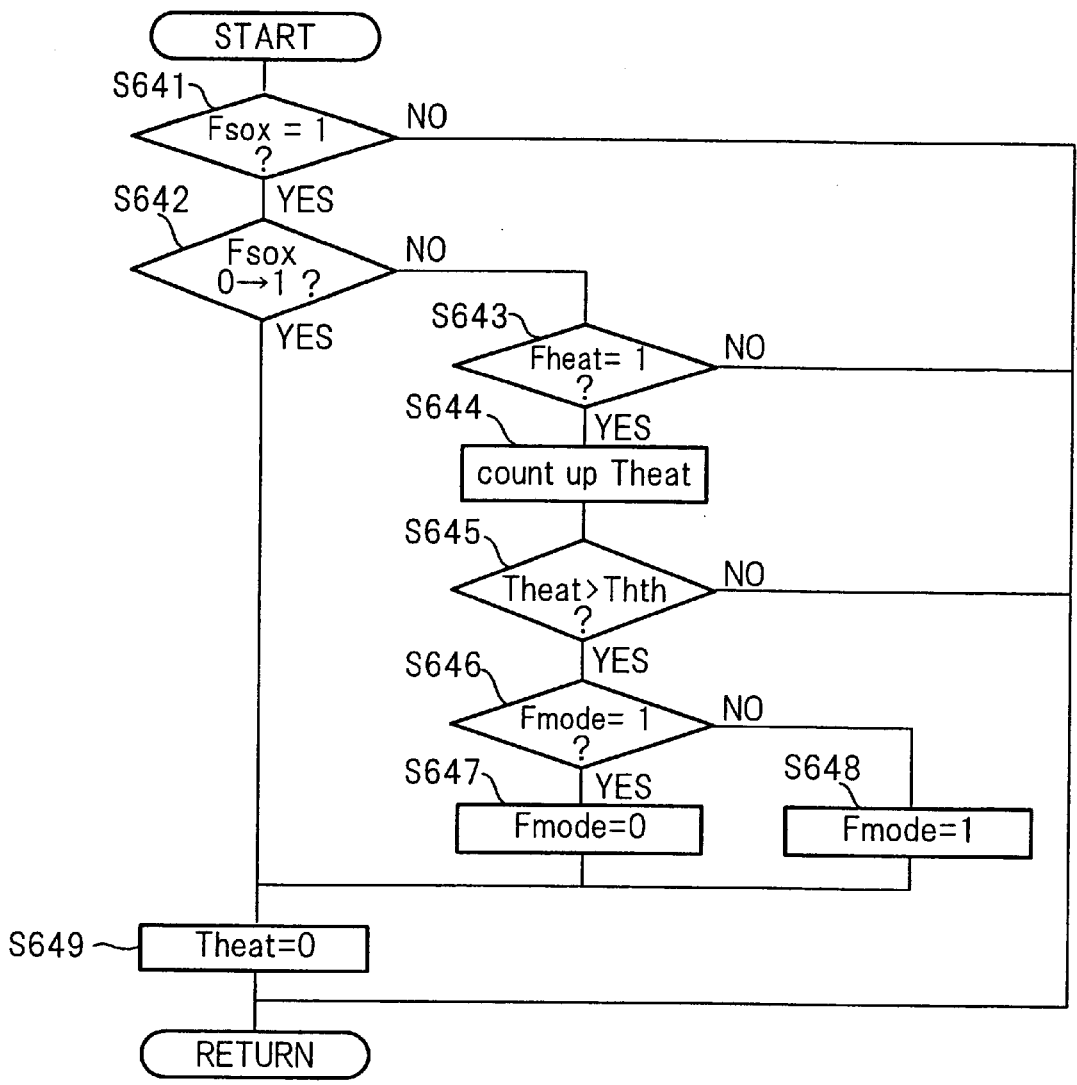
FIG. 25 is a flowchart for setting an air-fuel ratio mode according to a fourth embodiment.

FIG. 25 is a mode setting routine (2), and it is performed at an interval of 10 ms.

Here, a mode setting change-over is performed based on the elapsed time from when the conditions for increasing the temperature of the rear catalyst hold.

In this case, in a first setting mode where the average air-fuel ratio of the exhaust led to the first front catalyst is shifted to lean, and the air-fuel ratio of the exhaust led to the second front catalyst is shifted to rich, Fmode=1; whereas in a second setting mode which applies the reverse settings, Fmode=0.

First, in a step S641, it is determined whether or not the conditions hold for discharging SOx absorbed by the rear catalyst, from whether or not Fsox=1.

In S642, it is determined whether or not the timing is immediately after when the conditions for discharging SOx absorbed by the rear catalyst have changed from not holding to holding.

If the timing is immediately after changing to holding, the routine proceeds to S643, wherein it is determined whether or not the conditions for increasing the temperature of the rear catalyst hold from the flag Fheat.

If temperature increase conditions hold, in S644, a counter Theat for measuring elapsed time from when the conditions for increasing temperature of the rear catalyst hold, is counted. Subsequently, in S645, it is determined whether or not the elapsed time Theat after the conditions for increasing the temperature of the rear catalyst hold, is larger than a predetermined time Thth.

When this elapsed time Theat is larger than the predetermined time Thth, the value of the present flag Fmode is determined in steps S646–S648, and Fmode is set to a different value from the present value.

After these mode settings are made or temperature increase condition has just held, the routine proceeds to S649, and the counter Theat is reset to 0.

In this case, by making the time for which the first and second front catalysts are exposed to lean exhaust, and the time for which they are exposed to rich exhaust, substantially the same for both catalysts, the deterioration rate of both front catalyst can be made almost the same.

Next, a fifth embodiment will be described. In this embodiment, the only difference from the first-fourth embodiments is the SOx discharge determining routine, so the discussion will focus on this part.

Figure 26:
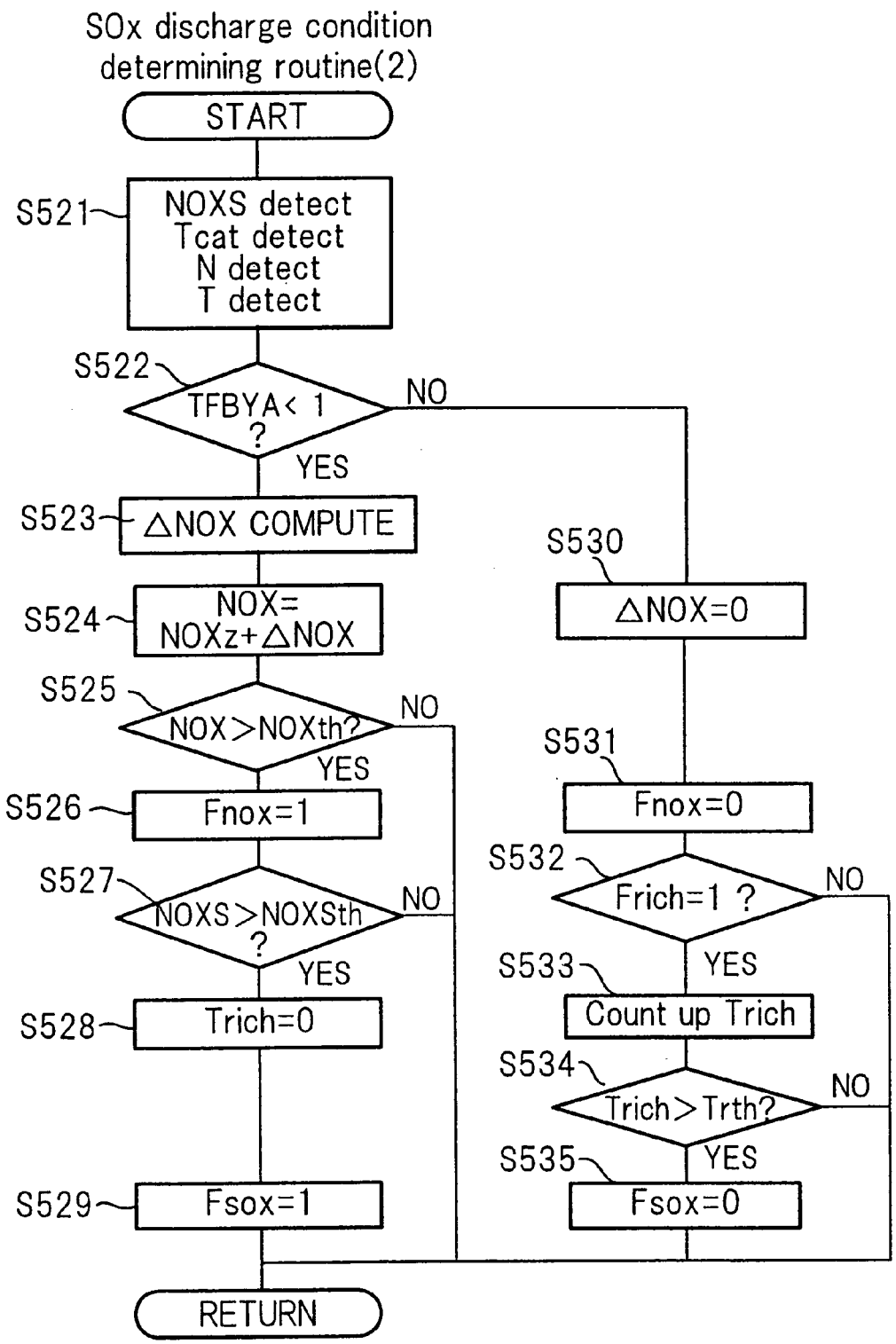
FIG. 26 is a flowchart for determining SOx discharge conditions according to a fifth embodiment.

FIG. 26 is an SOx discharge condition determining routine (2), and it is performed at an interval of 10 ms.

Here, the presence or absence of SOx deposition on the catalyst is determined based on the NOx concentration of the exhaust flowing from the rear catalyst, and a flag Fsox is set depending on whether conditions hold or do not hold for discharging SOx absorbed by the rear catalyst. In this case, when SOx discharge conditions hold, Fsox is set to 1, and when they do not hold, Fsox is set to 0.

First, in S521, the output of the NOx sensor is A/D converted to determine an NOx concentration signal NOXS, and the output of the catalyst temperature sensor is A/D converted to determine the catalyst temperature Tcat. Further, the engine rotation speed N is calculated based on the occurrence interval of a predetermined signal from the crank angle sensor, and the engine load T (for example, a target generated engine torque) depending on the accelerator depression amount) is calculated based on the output of the accelerator position sensor.

In S522, it is determined whether or not the air-fuel ratio is controlled to lean (TFBYA<1).

In S523, an amount $\Delta$NOX which is the amount of NOx absorbed by the rear catalyst in a predetermined time (here, 10 ms), is computed.

Here, $\Delta$NOX=(NOx amount flowing into rear catalyst in a predetermined time)*(NOx absorption coefficient of rear catalyst).

The NOx amount flowing into the rear catalyst in a predetermined time is computed as a parameter of for example engine rotation speed N, engine load T and average air-fuel ratio.

The NOx absorption rate of the rear catalyst (NOx amount absorbed in unit time/Nox amount flowing into in unit time) is computed as a parameter of for example NOXz which is the present NOx absorption amount (estimated value of NOx absorption amount computed on immediately preceding occasion), catalyst temperature Tcat, and average air-fuel ratio. As the average air-fuel ratio, the target equivalent ratio TFBYA set by the target air-fuel ratio setting routine can be used.

The NOx absorption rate of the rear catalyst is a value from 0 to 1, and it has the following characteristics relative to various parameters. Specifically, the NOx absorption rate is larger the smaller the NOx absorption amount, and is a maximum when the NOx absorption amount is 0. The NOx absorption rate is a maximum when the rear catalyst is at a predetermined temperature, becomes smaller the lower the temperature is below the predetermined temperature, and is 0 when the temperature is at or below the catalyst activation temperature. It also becomes smaller the higher the temperature is above a predetermined temperature. The NOx absorption rate becomes smaller the less the degree of leanness of the air-fuel ratio, and is 0 at an air-fuel ratio which is richer than the stoichiometric air-fuel ratio.

In S524, $\Delta$NOX is added to NOXz which is the estimated NOx amount computed on the immediately preceding occasion so as to compute NOX, which is the most recent estimated NOx amount.

In S525, it is determined whether or not this estimated NOX is equal to or greater than a predetermined amount NOXth. Here, the predetermined amount NOXth is set to, or a value slightly less than, an NOx absorption permitted amount of the rear catalyst.

When the NOx amount reaches the predetermined amount, a flag Fnox which shows that the conditions hold for discharging NOx absorbed by the catalyst is set to 1 in S526.

Thus, if Fnox is 1, rich control of the air-fuel ratio is temporarily performed by a rich spike control routine which is independent of this routine and not shown, and NOx is discharged and reduced (however, this control is not directly concerned with SOx discharge which is the main subject of this invention).

In S527, it is determined whether or not the NOx concentration signal NOXS is equal to or greater than a permitted value NOXSth.

Figure 28:
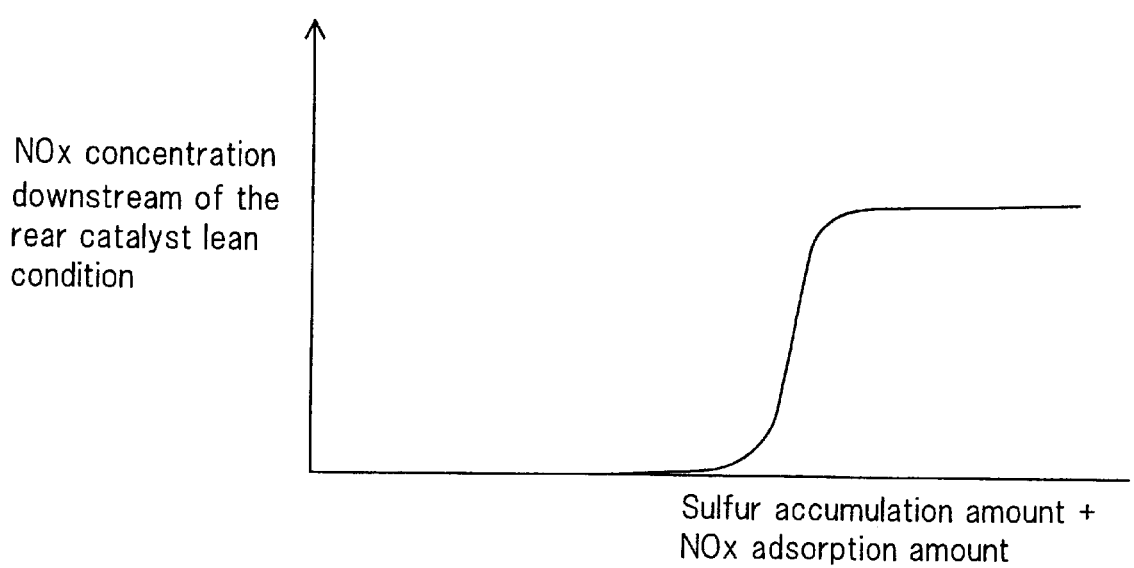
FIG. 28 is a descriptive drawing showing NOx absorption characteristics of the rear catalyst.

As shown in FIG. 28, the NOx absorption rate of the rear catalyst (NOx amount which can be absorbed in unit time) decreases the more the total amount of NOx and SOx absorbed by the rear catalyst increases, and when the NOx absorption rate decreases, the NOx amount discharged downstream of the rear catalyst increases.

By setting the NOx concentration corresponding to the NOx amount flowing downstream of the catalyst when the maximum permitted amount of SOx and the predetermined amount NOxth of NOx are absorbed by the catalyst, to a permitted value NOXSth, it may be determined whether or not the SOx amount deposited is equal to or greater than a permitted amount.

If the SOx deposition amount reaches the maximum permitted amount, in S528, a counter Trich for measuring an elapsed time from when air-fuel ratio enrichment conditions hold is reset to 0.

In S529, the flag Fsox is set to 1. Due to this, the conditions for discharging SOx from the rear catalyst hold, i.e. SOx removal control is permitted.

On the other hand, if lean conditions do not hold in S522, the routine proceeds to S530, and NOX which is the estimated NOx absorption amount is set to 0. This is because, if the air-fuel ratio is controlled to the stoichiometric air-fuel ratio or rich, the NOx absorbed by the rear catalyst is rapidly discharged.

The flag Fnox is then set to 0 in S531.

Further, in S532, it is determined whether or not the conditions hold for enriching the air-fuel ratio. If rich shift conditions hold, the value of the counter Trich is counted in S533.

In S534, it is determined whether or not the elapsed time Trich after the conditions for enriching the air-fuel ratio hold, is longer than the predetermined time Trth. When rich shift of the air-fuel ratio is performed for longer than the predetermined time, it may be determined that SOx elimination from the rear catalyst is complete. Therefore, in S535, the flag Fsox is set to 0 and it is assumed that the SOx deposition amount on the rear catalyst lies within a permitted range.

In the above, to simplify the computation of NOX, S532 may for example be omitted, and ΔNOX of S534 may be set to a fixed value.

Also, when the values of PHOSPLR and PHOSPRR are made variable, as described in the first embodiment, the computation of the estimated SOx amount is not performed according to this embodiment, so PHOSPLR and PHOSPRR are set according to the elapsed time from when conditions hold for enriching the air-fuel ratio.

Even when the values of PHOSR, DHOSR are made variable, as shown in the second and third embodiments, the computation may be performed from when the conditions hold for enriching the air-fuel ratio.

Hence, from the above, the SOX deposition amount on the rear catalyst may be precisely determined by measuring the NOx concentration, and completion of SOx removal can be estimated from the enriching time.

Figure 27:
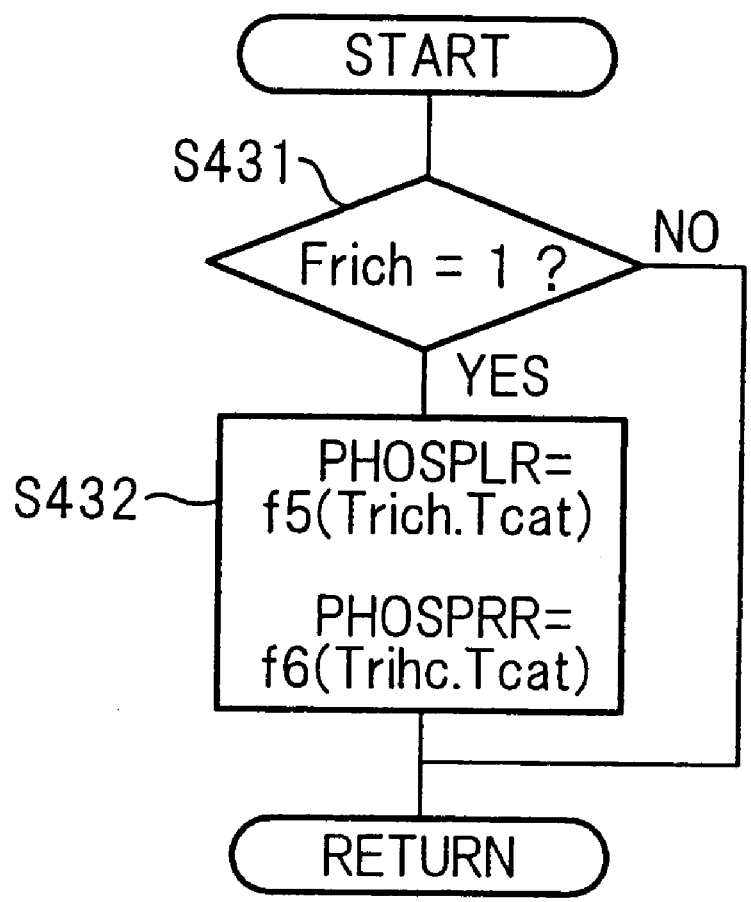
FIG. 27 is a flowchart for setting a basic control constant.

Next, FIG. 27 is a PHOSPLR, PHOSPRR setting routine (2), and it is performed at an interval of 10 ms.

This is used when in case the SOx diposition amount is not computed, PHOSPLR, PHOSPRR of the air-fuel ratio control value setting routine are set variably in conjunction with the SOx discharge amount.

First, in S431, it is determined whether or not the conditions hold for enriching the air-fuel ratio by determining whether or not the flag Frich is 1. When these conditions hold, in S432, the values of PHOSPLR, PHOSPRR are computed by parameters $f5$, $f6$.

In this case, $f5$, $f6$ are determined so that the degree of rich shift has the following characteristics relative to various parameters. The degree of rich shift becomes smaller the longer the elapsed time Trich from when conditions hold for enriching the air-fuel ratio, and is 0 when Trich=Trth. Also, the degree of rich shift is smaller the lower the rear catalyst temperature, and is 0 at or below the SOx discharge temperature.

Therefore in this case, after discharge of SOx begins, enrichment of the air-fuel ratio decreases with elapsed time, air-fuel ratio control is performed corresponding to the SOx amount which actually remains, there is no unnecessary rich shift, and fuel-cost performance is improved.

Next, a sixth embodiment will be described. According to this sixth embodiment, the only difference from the aforesaid first-fourth embodiments is the SOx discharge determining routine.

Figure 29:
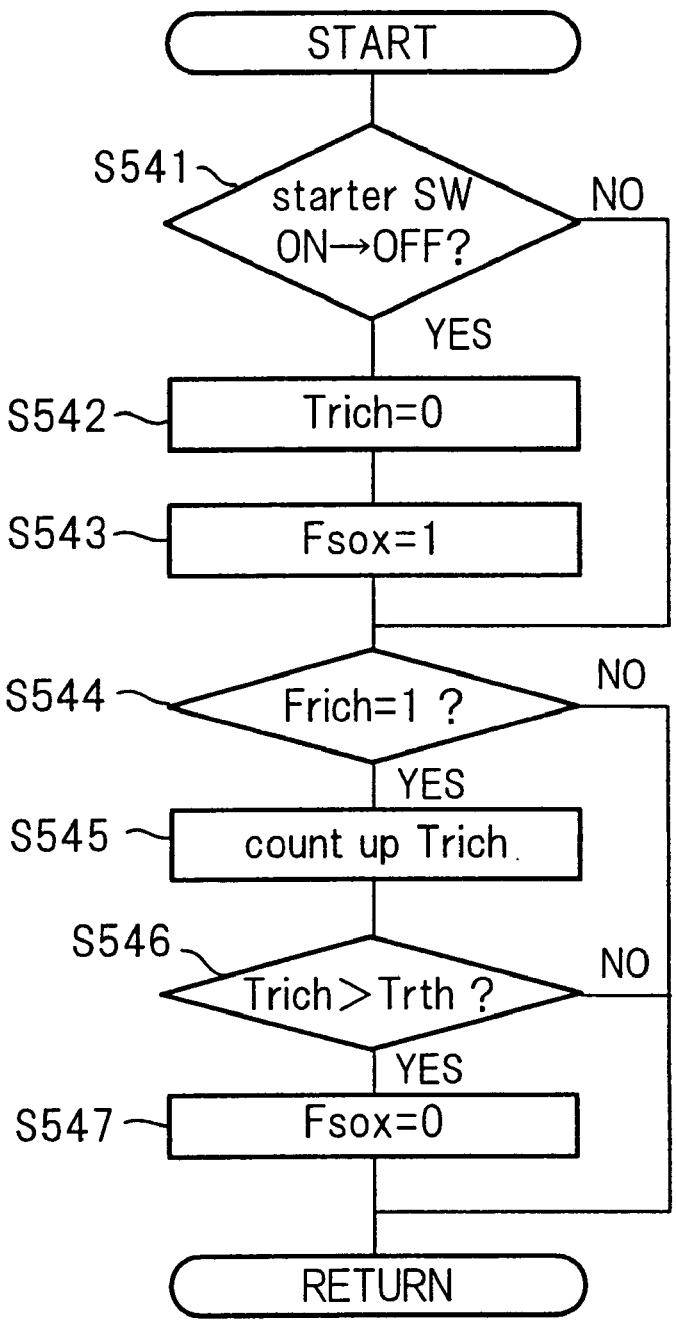
FIG. 29 is a flowchart for determining SOx discharge conditions according to a sixth embodiment.

FIG. 29 is an SOx discharge condition determining routine (3), and it is performed at an interval of 10 ms.

Here, by determining whether or not the engine has started, it is determined whether or not the conditions hold for discharging SOx absorbed by the rear catalyst and the flag Fsox is set to 1. When the conditions hold for discharging SOx absorbed by the rear catalyst, Fsox is set to 1, and when the conditions do not hold, Fsox is set to 0.

First, in S541, it is determined whether or not a starter switch has changed from ON to OFF, and when it has changed from ON to OFF, the counter Trich for measuring elapsed time from when the conditions hold for enriching the air-fuel ratio is reset to 0 in S542. In S543, the flag Fsox is set to 1.

In S544, it is determined whether or not the conditions hold for enriching the air-fuel ratio, and if so, the counter Trich is counted in S545.

In S546, it is determined whether or not the elapsed time Trich after the conditions hold for enriching the air-fuel ratio is longer than the predetermined time Trth. When enrichment was performed for a predetermined time due to this result, it is determined that SOx discharging from the catalyst is complete. In S547, the flag Fsox is set to 0.

Therefore, according to this embodiment, SOx removal control by enriching the air-fuel ratio is automatically performed only once after engine startup.

However, the method of this routine is performed regardless of the SOx amount absorbed by the rear catalyst, so the SOx amount when air-fuel ratio enrichment control starts is not fixed.

For this reason, if it is desired to perform rich shift efficiently, it is desirable to compute the estimated SOx amount, and set the above-mentioned PHOHPLR, PHO-HPLR by the PHOHPLR, PHOSPRR setting routine (1), or set PHOSR by the PHOSR setting routine (1).

The entire contents of Japanese Patent Application P10-104762 (filed Apr. 15, 1998), P10-332470 (filed Nov. 24, 1998) and P11-79492 (filed Mar. 24, 1999) are incorporated herein by reference. Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:
   determine the conditions under which the temperature of the rear three-way catalyst should be increased, and
   set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst;

a first air-fuel ratio sensor installed in said first exhaust passage; and a second air-fuel ratio sensor installed in said second exhaust passage, wherein said first air-fuel ratio controller computes a first feedback correction coefficient based on the output of said first air-fuel ratio sensor, corrects a fuel amount supplied to said first cylinder group using this first feedback correction coefficient, and thereby feedback controls the air-fuel ratio of exhaust led to said first front three-way catalyst, and wherein said second air-fuel ratio controller computes a second feedback correction coefficient based on the output of said second air-fuel ratio sensor, corrects a fuel amount supplied to said second cylinder group using this second feedback correction coefficient, and thereby feedback controls the air-fuel ratio of exhaust led to said second front three-way catalyst, wherein said first and second sensors are so designed that their outputs vary sharply around the stoichiometric air-fuel ratio relative to variation of the air-fuel ratio of the exhaust gas, wherein said first air-fuel ratio controller computes a first feedback correction coefficient by subtracting a first lean shift proportional part when the output of said first air-fuel ratio sensor changes from lean to rich, and adding a first rich shift proportional part when it changes from rich to lean, wherein said second air-fuel ratio controller computes a second feedback correction coefficient by subtracting a second lean shift proportional part when the output of said second air-fuel ratio sensor changes from lean to rich, and adding a second rich shift proportional part when it changes from rich to lean, and wherein said microprocessor is further programmed to set a control midpoint value of the air-fuel ratio of exhaust gas controlled by said first and second air-fuel ratio controllers, to a predetermined air-fuel ratio by setting said first lean shift proportional part, said rich shift proportional part, said second lean shift proportional part and said second rich shift proportional part respectively to predetermined values.

2. An exhaust purification device for an internal combustion engine as defined in claim 1, further comprising a rear air-fuel ratio sensor installed in said exhaust passage, and a rear air-fuel ratio controller for correcting the setting of the air-fuel ratio by said microprocessor based on the output of said rear air-fuel ratio sensor, and controlling the air-fuel ratio of the exhaust led to said rear three-way catalyst to a predetermined air-fuel ratio.

3. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:
determine the conditions under which the temperature of the rear thruway catalyst should be increased, and set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air fuel ratio than the stoichiometric air-fuel ratio, when the conditions hold for increasing the temperature of said rear three-way catalyst;

a first air-fuel ratio sensor installed in said first exhaust passage; and a second air-fuel ratio sensor installed in said second exhaust passage, wherein said first air-fuel ratio controller computes a first feedback correction coefficient based on the output of said first air-fuel ratio sensor, corrects a fuel amount supplied to said first cylinder group using this first feedback correction coefficient, and thereby feedback controls the air-fuel ratio of exhaust led to said first front three-way catalyst, and wherein said second air-fuel ratio controller computes a second feedback correction coefficient based on the output of said second air-fuel ratio sensor, corrects a fuel amount supplied to said second cylinder group using this second feedback correction coefficient, and thereby feedback controls the air-fuel ratio of exhaust led to said second front three-way catalyst, wherein said first and second sensors are so designed that their outputs vary sharply around the stoichiometric air-fuel ratio relative to variation of the air-fuel ratio of the exhaust gas, wherein said first air-fuel ratio controller computes a first feedback correction coefficient by subtracting a first lean shift proportional part after a first lean shift delay time from when the output of said first air-fuel ratio sensor changes from lean to rich, and adding a first rich shift proportional part after a first rich shift delay time from when it changes from rich to lean, wherein said second air-fuel ratio controller computes a second feedback correction coefficient by likewise subtracting a second lean shift proportional part after a second lean shift delay time from when the output of said second air-fuel ratio sensor changes from lean to rich, and adding a second rich shift proportional part after a second rich shift delay time from when it changes from rich to lean, and wherein said microprocessor is further programmed to set a control midpoint of the air-fuel ratio of the exhaust gas controlled by said first and second air-fuel ratio controllers, to a predetermined air-fuel ratio by setting said first lean shift delay time, said first rich shift delay time, said second lean shift delay time and said second rich shift delay time respectively to predetermined values.

4. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio; and a microprocessor programmed to:

determine the conditions under which the temperature of the rear thruway catalyst should be increased, and set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, wherein said microprocessor is further programmed to alternate between a first setting mode wherein the air-fuel ratio of the exhaust controlled by said first air-fuel ratio controller is set leaner than the stoichiometric air-fuel ratio and the air-fuel ratio of the exhaust controlled by said second air-fuel ratio controller is set richer than the stoichiometric air-fuel ratio, and a second setting mode wherein the air-fuel ratio of the exhaust controlled by said first air-fuel ratio controller is set richer than the stoichiometric air-fuel ratio and the air-fuel ratio of the exhaust controlled by said second air-fuel ratio controller is set leaner than the stoichiometric air-fuel ratio, when the conditions hold for increasing the temperature of the rear three-way catalyst, and wherein said microprocessor is further programmed to alternate between said first setting mode and said second setting mode whenever a running time in one of these setting modes reaches a predetermined time.

5. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:

determine the conditions under which the temperature of the rear three-way catalyst should be increased, set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, alternate between said first setting mode and said second setting mode whenever a running time in one of these setting modes reaches a predetermined time, and determine conditions under which Sox deposited on said rear three-way catalyst should be discharged, and determine that the conditions hold for increasing the temperature of said rear three-way catalyst when the conditions hold for discharging Sox which has been absorbed and deposited on said rear three-way catalyst, and a startup detecting sensor for detecting startup of said internal combustion engine, wherein said microprocessor is further programmed to determine that the conditions hold for discharging SOx which has been absorbed and deposited on said rear three-way catalyst when startup of said engine is detected.

6. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio; and a microprocessor programmed to:

determine the conditions under which the temperature of the rear three-way catalyst should be increased, set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, alternate between said first setting mode and said second setting mode whenever a running time in one of these setting modes reaches a predetermined time, and determine conditions under which Sox deposited on said rear three-way catalyst should be discharged, and determine that the conditions hold for increasing the temperature of said rear three-way catalyst when the conditions hold for discharging Sox which has been absorbed and deposited on said rear three-way catalyst, and estimate an SOx amount which has been absorbed and deposited on said rear three-way catalyst, and determine conditions for discharging SOx deposited on said rear three-way catalyst based on said estimated SOx deposit amount.

7. An exhaust purification device for an internal combustion engine as defined in claim 6, wherein said microprocessor is further programmed to determine that the conditions hold for discharging SOx deposited on said rear three-way catalyst when said estimated SOx deposition amount is equal to or greater than a first predetermined amount, and determine that SOx discharge conditions no longer hold when said estimated SOx deposition amount has fallen to or below a second predetermined amount less than said first predetermined amount.

8. An exhaust purification device for an internal combustion engine comprising:
- a first front three-way catalyst installed in a first exhaust passage connected to a first cylinder group;
- a second front three-way catalyst installed in a second exhaust passage connected to a second cylinder group;
- a rear three-way catalyst installed in an exhaust gas passage which combines the exhaust of said first and second exhaust passages;
- a first air-fuel ratio controller for controlling the air-fuel ratio of the exhaust led to said first front three-way catalyst to a predetermined air-fuel ratio;
- a second air-fuel ratio controller for controlling the air-fuel ratio of the exhaust led to said second front three-way catalyst to a predetermined air-fuel ratio;
- a microprocessor programmed to:
  - determine the conditions under which the temperature of the rear three-way catalyst should be increased,
  - set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst,
  - alternate between said first setting mode and said second setting mode whenever a running time in one of these setting modes reaches a predetermined time, and
  - determine conditions under which Sox deposited on said rear three-way catalyst should be discharged, and determine that the conditions hold for increasing the temperature of said rear three-way catalyst when the conditions hold for discharging Sox which has been absorbed and deposited on said rear three-way catalyst, and
- an NOx concentration sensor for detecting the NOx concentration of the exhaust flowing from said rear three-way catalyst, and
- wherein said microprocessor is further programmed to estimate an NOx amount absorbed on said rear three-way catalyst, and determine that conditions hold for discharging the SOx deposited on said rear three-way catalyst based on said detected NOx concentration and said estimated NOx absorption amount.

9. An exhaust purification device for an internal combustion engine as defined in claim 8, wherein
said microprocessor is further programmed to determine that the conditions hold for discharging deposited SOx when the NOx concentration, detected at a time when the NOx amount absorbed on said rear three-way catalyst is equal to or greater than a predetermined amount, is greater than a predetermined permitted value.

10. An exhaust purification device for an internal combustion engine comprising:
- a first front three-way catalyst installed in a first exhaust passage connected to a first cylinder group;
- a second front three-way catalyst installed in a second exhaust passage connected to a second cylinder group;
- a rear three-way catalyst installed in an exhaust gas passage which combines the exhaust of said first and second exhaust passages;
- a first air-fuel ratio controller for controlling the air-fuel ratio of the exhaust led to said first front three-way catalyst to a predetermined air-fuel ratio;
- a second air-fuel ratio controller for controlling the air-fuel ratio of the exhaust led to said second front three-way catalyst to a predetermined air-fuel ratio;
- a microprocessor programmed to:
  - determine the conditions under which the temperature of the rear three-way catalyst should be increased,
  - set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst,
  - alternate between said first setting mode and said second setting mode whenever a running time in one of these setting modes reaches a predetermined time, and
  - determine conditions under which Sox deposited on said rear three-way catalyst should be discharged, and determine that the conditions hold for increasing the temperature of said rear three-way catalyst when the conditions hold for discharging Sox which has been absorbed and deposited on said rear three-way catalyst, and
- a running condition detecting sensor for detecting running conditions,
- wherein said microprocessor is further programmed to determine that the conditions do not hold for increasing the temperature of said rear three-way catalyst when the detected running conditions are outside a predetermined SOx discharge running region, regardless of whether or not the conditions hold for discharging SOx deposited on said rear three-way catalyst.

11. An exhaust purification device for an internal combustion engine comprising:
- a first front three-way catalyst installed in a first exhaust passage connected to a first cylinder group;
- a second front three-way catalyst installed in a second exhaust passage connected to a second cylinder group;
- a rear three-way catalyst installed in an exhaust gas passage which combines the exhaust of said first and second exhaust passages;
- a first air-fuel ratio controller for controlling the air-fuel ratio of the exhaust led to said first front three-way catalyst to a predetermined air-fuel ratio;
- a second air-fuel ratio controller for controlling the air-fuel ratio of the exhaust led to said second front three-way catalyst to a predetermined air-fuel ratio;
- a microprocessor programmed to:
  - determine the conditions under which the temperature of the rear three-way catalyst should be increased,
  - set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst,
  - alternate between said first setting mode and said second setting mode whenever a running time in one of these setting modes reaches a predetermined time, and
  - determine conditions under which Sox deposited on said rear three-way catalyst should be discharged, and determine that the conditions hold for increasing the temperature of said rear three-way catalyst when the conditions hold for discharging Sox which has been absorbed and deposited on said rear three-way catalyst, and a temperature measuring sensor for detecting a temperature of said rear three-way catalyst, wherein said microprocessor is further programmed to determine that the conditions do not hold for increasing the temperature of said rear three-way catalyst when the temperature of said three-way catalyst exceeds a permitted temperature even when the temperature of said rear three-way catalyst is equal to or greater than a predetermined SOx discharge temperature, regardless of whether or not the conditions hold for discharging SOx deposited on said rear three-way catalyst.

12. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:

determine the conditions under which the temperature of the rear three-way catalyst should be increased, set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, alternate between said first setting mode and said second setting mode whenever a running time in one of these setting modes reaches a predetermined time, and determine conditions under which Sox deposited on said rear three-way catalyst should be discharged, and determine that the conditions hold for increasing the temperature of said rear three-way catalyst when the conditions hold for discharging Sox which has been absorbed and deposited on said rear three-way catalyst, and a temperature measuring sensor for detecting a temperature of said rear three-way catalyst, wherein said microprocessor is further programmed to set the air-fuel ratios of the exhaust controlled by said first and second air-fuel ratio controllers such that the air-fuel ratio of the exhaust led to said rear three-way catalyst is richer than the stoichiometric air-fuel ratio when the conditions hold for discharging SOx deposited on said rear three-way catalyst, and the temperature of said rear three-way catalyst is equal to or greater than an SOx discharge temperature, and wherein said microprocessor is further programmed to set the degree of richness of the air-fuel ratio to be greater the larger the SOx amount deposited on said rear three-way catalyst.

13. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:

determine the conditions under which the temperature of the rear three-way catalyst should be increased, set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, alternate between said first setting mode and said second setting mode whenever a running time in one of these setting modes reaches a predetermined time, and determine conditions under which Sox deposited on said rear three-way catalyst should be discharged, and determine that the conditions hold for increasing the temperature of said rear three-way catalyst when the conditions hold for discharging Sox which has been absorbed and deposited on said rear three-way catalyst, and a temperature measuring sensor for detecting a temperature of said rear three-way catalyst, wherein said microprocessor is further programmed to set the air-fuel ratios of the exhaust controlled by said first and second air-fuel ratio controllers such that the air-fuel ratio of the exhaust led to said rear three-way catalyst is richer than the stoichiometric air-fuel ratio when the conditions hold for discharging SOx deposited on said rear three-way catalyst, and the temperature of said rear three-way catalyst is equal to or greater than an SOx discharge temperature, and wherein said microprocessor is further programmed to set the degree of richness of the air-fuel ratio to be smaller the longer the elapsed time from when air-fuel ratio rich shift control starts.

14. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:

determine the conditions under which the temperature of the rear three-way catalyst should be increased, and set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, and an exhaust valve opening timing control device for applying an advance correction to an opening timing of an exhaust valve which is preset according to running conditions when the conditions hold for increasing the temperature of said rear three-way catalyst.

15. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:

determine the conditions under which the temperature of the rear three-way catalyst should be increased, and set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, and an exhaust gas recirculation control device for applying a reduction correction to an exhaust gas recirculation amount which is preset according to running conditions when the conditions hold for increasing the temperature of said rear three-way catalyst.

16. An exhaust purification device for an internal combustion engine comprising:

a first front three-way catalyst installed in a first exhaust passage connected to a first cylinder group;

a second front three-way catalyst installed in a second exhaust passage connected to a second cylinder group;

a rear three-way catalyst installed in an exhaust gas passage which combines the exhaust of said first and second exhaust passages;

a first air-fuel ratio controller for controlling the air-fuel ratio of the exhaust led to said first front three-way catalyst to a predetermined air-fuel ratio;

a second air-fuel ratio controller for controlling the air-fuel ratio of the exhaust led to said second front three-way catalyst to a predetermined air-fuel ratio;

a microprocessor programmed to:

determine the conditions under which the temperature of the rear three-way catalyst should be increased, and set the air-fuel ratio of the exhaust controlled by one of said air-fuel ratio controllers to a richer air-fuel ratio than the stoichiometric air-fuel ratio, and set the air-fuel ratio of the exhaust controlled by the other of said air-fuel ratio controllers to a leaner air-fuel ratio than the stoichiometric air-fuel ratio, when the conditions hold for increasing the temperature of said rear three-way catalyst, and an ignition timing control device for applying a delay correction to an ignition timing which is preset according to running conditions when the conditions hold for increasing the temperature of said rear three-way catalyst.

* * * * *